(12) United States Patent
Katashiba et al.

(10) Patent No.: US 9,019,633 B2
(45) Date of Patent: Apr. 28, 2015

(54) CATADIOPTRIC SYSTEM AND IMAGE PICKUP APPARATUS

(75) Inventors: Yuji Katashiba, Utsunomiya (JP); Kazuhiko Kajiyama, Utsunomiya (JP); Masayuki Suzuki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 436 days.

(21) Appl. No.: 13/581,663

(22) PCT Filed: May 19, 2011

(86) PCT No.: PCT/JP2011/062039
§ 371 (c)(1),
(2), (4) Date: Aug. 29, 2012

(87) PCT Pub. No.: WO2011/148999
PCT Pub. Date: Dec. 1, 2011

(65) Prior Publication Data
US 2012/0320187 A1    Dec. 20, 2012

(30) Foreign Application Priority Data

May 27, 2010   (JP) .................................. 2010-121751

(51) Int. Cl.
*G02B 17/08*   (2006.01)

(52) U.S. Cl.
CPC .................................. *G02B 17/0808* (2013.01)

(58) Field of Classification Search
CPC .............................. G02B 7/08; G02B 17/0856
USPC .................................. 359/364–366, 726–731
See application file for complete search history.

(56) References Cited

U.S. PATENT DOCUMENTS

| | | | |
|---|---|---|---|
| 6,639,734 B2 * | 10/2003 | Omura | 359/730 |
| 2004/0027662 A1 | 2/2004 | Kurioka et al. | |

(Continued)

FOREIGN PATENT DOCUMENTS

| | | |
|---|---|---|
| EP | 1 387 207 A2 | 2/2004 |
| JP | 53-112759 A | 10/1978 |

(Continued)

OTHER PUBLICATIONS

Office Action issued in corresponding Chinese Patent Application No. 201180025349.5 dated May 16, 2014. English translation provided.

(Continued)

*Primary Examiner* — Ricky Mack
*Assistant Examiner* — Gary O'Neill
(74) *Attorney, Agent, or Firm* — Rossi, Kimms & McDowell LLP

(57) ABSTRACT

The catadioptric system includes a first optical imaging system (catadioptric part) causing a light flux from an object to form an intermediate image and a second optical imaging system (dioptric part) causing the light flux from the intermediate image to form an image. In the first optical imaging system, the light flux sequentially passes a first transmissive portion, a second reflective portion, a first reflective portion and a second transmissive portion. In the second optical imaging system, consecutive four lens surfaces among plural lens surfaces placed between an aperture stop and an image surface have a negative combined refractive power, and a condition of $-0.52 < \phi_{4n\_max} \cdot Y_{max} < -0.14$ is satisfied, $\phi_{4n\_max}$ represents a maximum value of the negative combined refractive power, and $Y_{max}$ represents a maximum object height in a field-of-view of the catadioptric system at the object.

6 Claims, 12 Drawing Sheets

(56) References Cited

U.S. PATENT DOCUMENTS

2006/0082905 A1    4/2006   Shafer et al.
2009/0168189 A1    7/2009   Omura

FOREIGN PATENT DOCUMENTS

| JP | 2001-517806 A | 10/2001 |
|---|---|---|
| JP | 2002-082285 A | 3/2002 |
| JP | 2005-115127 A | 4/2005 |
| WO | 99/08134 A2 | 2/1999 |
| WO | 2009/154731 A2 | 12/2009 |

OTHER PUBLICATIONS

Notification of Transmittal of the International Search Report and The Written Opinion of the International Searching Authority issued in PCT/JP2011/062039, mail date Aug. 16, 2011.

* cited by examiner

CATADIOPTRIC SYSTEM AND IMAGE PICKUP APPARATUS

This application is a U. S. National Phase Application of PCT International Application PCT/JP2011/062039 filed on May 19, 2011, which is based on and claims priority from JP 2010-121751 filed on May 27, 2010, the contents of which is incorporated in its entirety by reference.

TECHNICAL FIELD

The present invention relates to a catadioptric system suitable for enlarging and observing a sample (object), and to an image pickup apparatus with the same.

BACKGROUND ART

In recent pathological examinations, an examiner observes pathological specimens (samples) not only directly with his/her eyes through an optical microscope, but also through image data taken by a virtual microscope and displayed on a display device. Such a virtual microscope enables plural examiners to simultaneously observe the image data of the pathological specimen displayed on the display device. Moreover, the virtual microscope provides many advantages including sharing of the image data with a distant pathologist to ask him/her for diagnosis. However, this method causes a problem of taking time because the image data is prepared by image taking of the pathology specimen.

One reason for taking time is that the image data is taken by using a conventional virtual microscope with a narrow image taking area with respect to a large pathological specimen. Such a narrow image taking area of the conventional virtual microscope makes taking of images of plural separate areas in the large pathological specimen, in other words, scanning of the pathological specimen, to combine the taken images into one image necessary. Therefore, an optical system (image-taking optical system) having a large image taking area is requested for the virtual microscope in order to reduce the number of times of image taking of the pathological specimen to shorten the time to obtain the image data as compared with the conventional virtual microscope.

Moreover, an optical system telecentric on an object side and an image side (that is, both sides) is requested in order to decrease influence (magnification variation or the like) on the image data due to positional errors of the pathological specimen and an image pickup element such as a CCD sensor in an image-taking optical axis direction.

In addition, for detailed observation of the pathological specimen, an optical system with not only the above-mentioned large image taking area but also a high resolving power in a visible wavelength range. Such an optical system having a high resolving power is requested for not only the pathological examinations but also various fields.

Japanese Patent Laid-Open No. 60-034737 discloses a microscope objective lens formed as a dioptric system whose aberrations are sufficiently reduced over the entire visible wavelength range and suitable for observing biological cells or the like. However, although the microscope objective lens disclosed in Japanese Patent Laid-Open No. 60-034737 sufficiently reduces the aberrations over the entire visible wavelength range, it has an observation area which is not necessarily sufficiently large.

Furthermore, Japanese translation of PCT international application No. 2001-517806 discloses a super-wideband ultraviolet microscope video system using a catadioptric system to achieve a high resolving power over a wide ultraviolet band, which is used for inspecting defects existing in integrated circuits and photomasks. However, although the super-wideband ultraviolet microscope video system disclosed in Japanese translation of PCT international application No. 2001-517806 achieves a high resolving power by sufficiently reducing aberrations over the wide ultraviolet band, it has a field-of-view which is not necessarily sufficiently large.

Moreover, Japanese Patent Laid-Open No. 2002-082285 discloses a catadioptric system of an exposure apparatus suitable for exposing minute patterns on a wide area to manufacture semiconductor devices. However, although the catadioptric system disclosed in Japanese Patent Laid-Open No. 2002-082285 achieves a high resolving power by sufficiently reducing aberrations over the wide area, it has a long total length. Such a long total optical system length increases the size of the exposure apparatus, which is inconvenient to install and operate the apparatus.

SUMMARY OF INVENTION

The present invention provides a catadioptric system having a good both-side telecentric property, being capable of sufficiently reducing various aberrations over a wide wavelength range and achieving a high resolving power over a wide image-taking area.

The present invention provides as an aspect thereof a catadioptric system that includes a first optical imaging system including a catadioptric part configured to collect a light flux from an object so as to cause the light flux to form an intermediate image of the object, and a second optical imaging system including a dioptric part configured to cause the light flux from the intermediate image to form an image on an image surface. The first optical imaging system includes, in order from an object side, a first optical element that includes a first transmissive portion in its central portion on and around an optical axis and a first reflective portion on its peripheral object side surface, and a second optical element that includes a second transmissive portion in its central portion on and around the optical axis and a second reflective portion on its peripheral image side surface, the first and second optical elements being arranged such that the first and second reflective surfaces face each other. The light flux from the object sequentially passes the first transmissive portion, the second reflective portion, the first reflective portion and the second transmissive portion in the first optical imaging system and then exits toward the second optical imaging system. The second optical imaging system includes, in order from the object side, a front lens group having a positive refractive power, an aperture stop and a rear lens group. In the second optical imaging system, consecutive four lens surfaces among plural lens surfaces placed between the aperture stop and the image surface have a negative combined refractive power, and the following condition is satisfied:

$$-0.52 < \phi_{4n\_max} \cdot Y_{max} < -0.14$$

where $\phi_{4n\_max}$ represents a maximum value of the negative combined refractive power, and $Y_{max}$ represents a maximum object height in a field-of-view of the catadioptric system at the object.

The present invention provides as another aspect thereof an image pickup apparatus that includes a light source, an illumination optical system configured to illuminate an object with a light flux from the light source, the above-described catadioptric system configured to cause the light flux from the object to form an object image, an image pickup element configured to convert the object image into an electrical signal, and an image processing system configured to produce image information from the electrical signal output from the image pickup element.

Other aspects of the present invention will become apparent from the following description and the attached drawings.

DESCRIPTION OF EMBODIMENTS

Exemplary examples of the present invention will hereinafter be described with reference to the accompanying drawings.

A catadioptric system of each example whose detailed description is made below is basically constituted by a first optical imaging system including a catadioptric part that collects a light flux from an object so as to cause the light flux to form an intermediate image IM and a second optical imaging system including a refractive part that causes the light flux from the intermediate image to form an image on an image surface.

Figure 1:
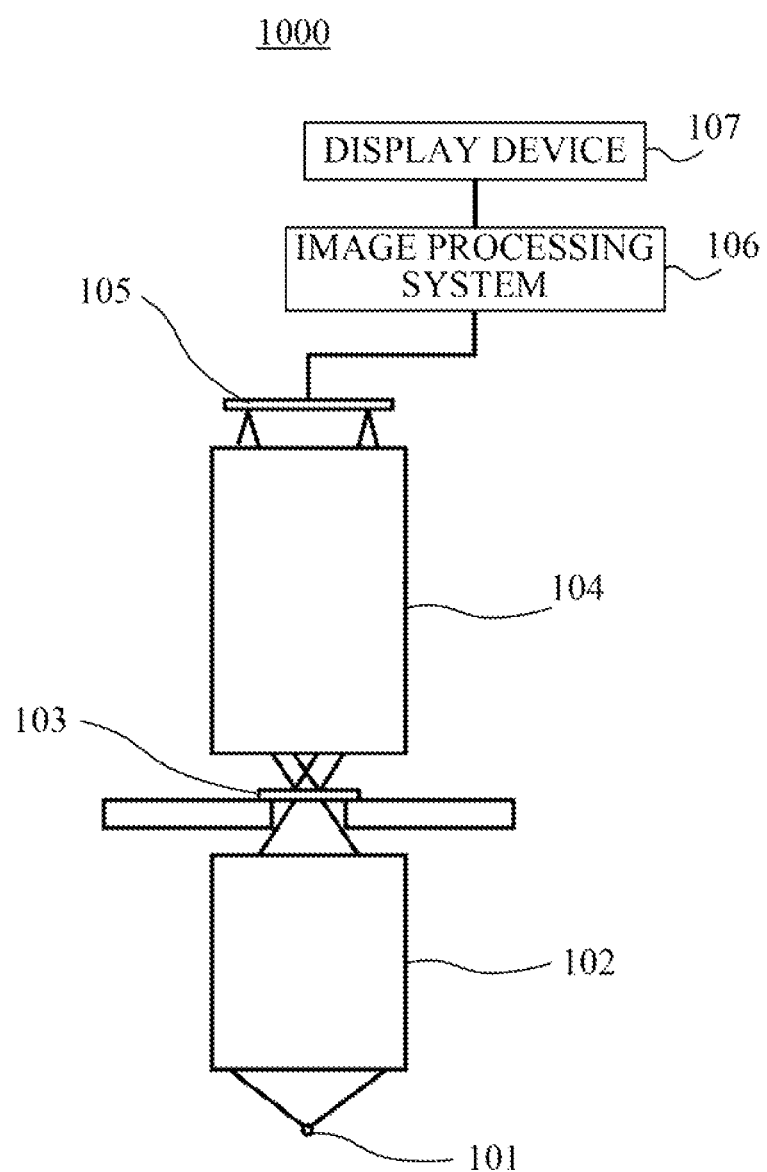
FIG. 1 is a cross-sectional view of an image pickup apparatus that is an example of the present invention.

FIG. 1 shows main parts of an image pickup apparatus 1000 as an example of the present invention. The image pickup apparatus 1000 is constituted by a light source 101, an illumination optical system 102 that illuminates the object 103 with a light flux from the light source 101 and a catadioptric system 104 that causes the light flux from the object 103 to form an object image. The image pickup apparatus further includes an image pickup element 105 that converts the object image formed by the catadioptric system 104 into an electrical signal and an image processing system 106 that produces image information by using the electrical signal output from the image pickup element 105.

Next, a detailed description of the configuration of the image pickup apparatus 1000 including the catadioptric system 104 is made. The image pickup apparatus 1000 collects light (light flux) from the light source 101 by the illumination optical system 102 to evenly illuminate a sample (object) 103 with the collected light. The light used therein is visible light having wavelengths from 400-700 nm. The catadioptric system 104 constitutes an optical imaging system that forms an image of the sample (object) 103 on the image pickup element 105. From the electrical signal output from the image pickup element 105, the image processing system 106 produces image data (image information) to display it on a display device 107 or the like. The image processing system 106 performs various processes such as correction of aberrations that cannot be sufficiently corrected by the optical imaging system (catadioptric system 104) and joining of image data obtained at different image-taking positions to form one image data.

Figure 2:
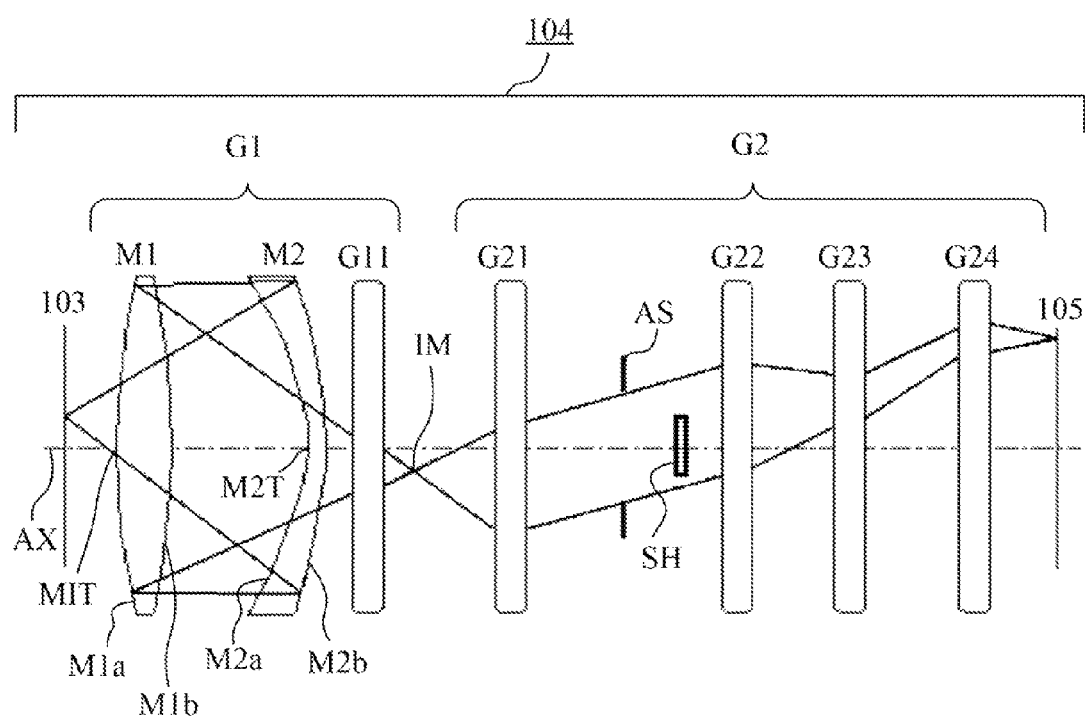
FIG. 2 shows a basic configuration of catadioptric systems of examples of the present invention.

FIG. 2 schematically shows the configuration of the catadioptric system 104. In FIG. 2, as also shown in FIG. 1, reference numeral 104 denotes the catadioptric system, reference numeral 103 denotes the object (sample), and reference numeral 105 denotes the image pickup element placed on the image surface. Reference character AX denotes an optical axis of the catadioptric system 104.

The catadioptric system 104 includes a first optical imaging system (catadioptric part) G1 that collects the light flux from the object (sample) 103 so as to cause the light flux to form an intermediate image IM on a predetermined surface. The first optical imaging system G1 includes reflective portions described later. The catadioptric system 104 further includes a second optical imaging system (refractive part) G2 including refractive surfaces that cause the light flux from the intermediate image IM to form an image on the image surface (image pickup element) 105 and an aperture stop AS.

The first optical imaging system G1 includes, in order from an object side toward an image surface side (or an image side), a first optical element (Mangin mirror) M1 and a second optical element (Mangin mirror) M2 and a lens group (field lens) G11. The second optical imaging system G2 includes, in order from the object side, a lens group G21, the aperture stop AS and lens groups G22-G24. The lens group G21 constitutes a front lens group, and the lens groups G22-G24 constitute a rear lens group. FIG. 2 schematically shows an off-axis light flux proceeding from the object 103 to the image surface on which the image pickup element 105 is placed.

The first optical element M1 of the first optical imaging system G1 has an object side surface with a convex shape. The first optical element M1 includes a transmissive portion M1T in its central portion on and around the optical axis, and a back-surface reflective portion M1a on its peripheral object side surface. The transmissive portion M1T has a positive refractive power. In the back-surface reflective portion M1a, a reflective coating is formed on its object side surface.

The second optical element M2 has a meniscus shape including an object side concave surface. The second optical element M2 includes a transmissive portion M2T in its central portion on and around the optical axis, and a back-surface reflective portion M2b on its peripheral image side surface. The transmissive portion M2T has a negative refractive power. In the back-surface reflective portion M2b, a reflective coating is formed on its image side surface. The first and second optical elements M1 and M2 are arranged such that the back-surface reflective portions M1a and M2b face each other.

In the second optical imaging system G2, a light-blocking plate SH is placed at a position of the aperture stop AS or at the vicinity thereof. The light-blocking plate SH blocks a light flux near the optical axis in the light flux from the object (sample) 103 to prevent the light flux near the optical axis from entering the image pickup element 105.

In the catadioptric system 104 shown in FIG. 2, the light flux exiting from the sample 103 that has been illuminated with the light flux from the illumination optical system 102 shown in FIG. 1 passes through the central transmissive portion M1T of the first optical element (Mangin mirror) M1.

Then, the light flux passes through a refractive surface M2a of the second optical element (Mangin mirror) M2, is reflected by the back-surface reflective portion M2b, and sequentially passes through the refractive surface M2a and a refractive surface M1b of the first optical element M1. Thereafter, the light flux is reflected by the back-surface reflective portion M1a of the first optical element M1 and sequentially passes through the refractive surface M1b thereof and the central transmissive portion M2T of the second optical element M2 to exit toward the second optical imaging system G2. The light flux then passes through the lens group G11 to form the intermediate image IM of the sample 103.

In the example, the configuration of the first optical imaging system G1 is not limited to the above-described one. For example, the first optical imaging system G1 may include a combination of a surface reflective mirror having a transmissive portion in its central portion and a lens, instead of each of the first and second optical elements M1 and M2 constituted by the Mangin mirrors. In addition, the first optical imaging system G1 may have a configuration to form the intermediate image IM without placing the lens group G11.

The light flux from the intermediate image IM which is a divergent light flux passes through the lens group G21 having a positive refractive power to form a pupil at the aperture stop AS. The light flux that has passed through the aperture stop AS sequentially passes through the lens group G22 having a positive refractive power, the lens group G23 having a negative refractive power and the lens group G24 having a positive refractive power, and then enters the image pickup element 105. The light flux entering the image pickup element 105 forms an enlarged image of the sample 103 thereon. The image of the sample 103 formed on the image pickup element 105 is converted into the electrical signal, and the electrical signal is processed by the image processing system 106 to be displayed in the display device 107.

The catadioptric system 104 of the example includes the lens group G23 having the negative refractive power between the aperture stop AS and the image surface (image pickup element 105). When an angle of an off-axis light flux with respect to the optical axis AX is small, it is necessary for achieving a large enlarging magnification to increase a total optical system length (that is, a distance from a surface of the object 103 to the image surface). However, in the catadioptric system 104 of the example, the off-axis light flux is significantly deviated away from the optical axis AX by the lens group G23 having a strong negative refractive power, and thereby the off-axis light flux can form a large angle with respect to the optical axis AX. Therefore, it is possible to achieve a large enlarging magnification with a short total optical system length. Moreover, the catadioptric system 104 of the example includes, immediately in front of the image surface (image pickup element 105), the lens group G24 having the positive refractive power. The lens group G24 returns the light flux significantly deviated by the lens group G23 to a light flux parallel to the optical axis AX, which makes the catadioptric system 104 telecentric on the image surface side.

In each example, the second optical imaging system G2 includes, in order from the object side, the front lens group G21 having the positive refractive power, the aperture stop AS and the rear lens group (G22-G24). Consecutive four lens surfaces among plural lens surfaces placed between the aperture stop AS and the image surface (image pickup element 105) have a negative combined refractive power, and the following condition (1) is satisfied:

$$-0.52 < \phi_{4n\_max} \cdot Y_{max} < -0.14 \quad (1)$$

where $\phi_{4n\_max}$ represents a maximum value of the negative combined refractive power of the consecutive four lens surfaces, and $Y_{max}$ represents a maximum object height in a field-of-view (object side field of view) of the catadioptric system 104 at the object.

A value of $\phi_{4n\_max} \cdot Y_{max}$ exceeding the upper limit of the condition (1) makes the negative combined refractive power too weak with respect to the field-of-view of the catadioptric system 104, which makes it difficult to significantly deviate the off-axis light flux away from the optical axis AX. Thus, it becomes difficult to achieve a large enlarging magnification with a short total optical system length.

On the other hand, the value of $\phi_{4n\_max} \cdot Y_{max}$ lower than the lower limit of the condition (1) makes negative refractive powers of the respective lens surfaces too strong, which makes aberrations generated at the respective lens surfaces too large. Thus, it becomes difficult to reduce various aberrations generated in the catadioptric system 104.

It is more desirable that the numerical range of the condition (1) be changed as follows:

$$-0.515 < \phi_{4n\_max} \cdot Y_{max} < -0.140 \quad (1a)$$

Furthermore, it is still more desirable that at least one of the following conditions be satisfied in each example.

It is desirable that the following condition be satisfied:

$$-0.58 < \phi_{n\_sum} \cdot Y_{max} < -0.17 \quad (2)$$

where $\phi_{n\_sum}$ represents a sum of negative refractive powers of negative lens surfaces placed between the aperture stop AS and the image surface (image pickup element) 105, and $Y_{max}$ represents the maximum object height in the field-of-view of the catadioptric system 104 at the object 103.

A value of $\phi_{n\_sum} \cdot Y_{max}$ exceeding the upper limit of the condition (2) makes the negative combined refractive power too weak with respect to the field-of-view of the catadioptric system 104, which makes it difficult to significantly deviate the off-axis light flux away from the optical axis AX. Thus, it becomes difficult to achieve a large enlarging magnification with a short total optical system length.

On the other hand, the value of $\phi_{n\_sum} \cdot Y_{max}$ lower than the lower limit of the condition (2) makes the negative refractive powers of the respective lens surfaces too strong, which makes it difficult to reduce various aberrations generated in the catadioptric system 104. In addition, increasing the number of lens surfaces having negative refractive powers in order to reduce the negative refractive power of each of the lens surfaces increases the number of lens surfaces to be processed, which makes it difficult to manufacture the catadioptric system 104. Furthermore, the increase of the number of the lens surfaces to be placed makes it difficult to shorten the total optical system length, which is undesirable.

It is more desirable that the numerical range of the condition (2) be changed as follows:

$$-0.580 < \phi_{n\_sum} \cdot Y_{max} < -0.175 \quad (2a)$$

Moreover, it is desirable that a combined refractive power $\phi_{L2}$ of two lenses placed immediately in front of the image surface (image pickup element 105) be a positive refractive power. This can return the off-axis light flux significantly deviated by the lens group G23 having a strong negative refractive power and disposed between the aperture stop AS and the image surface (image pickup element 105) to a light flux parallel to the optical axis AX, which makes it easy to make the catadioptric system 104 telecentric on the image surface side. In contrast thereto, if the combined refractive power $\phi_{L2}$ is a negative refractive power, a lens is required whose effective diameter is larger than a field-of-view at the image surface (image pickup element 105) in an optical path of the second optical imaging system G2. This increases the size of the optical system, which is undesirable.

Moreover, it is desirable that the first optical imaging system G1 include a first optical element constituted by a Mangin mirror having a lens shape and a positive refractive power and a second optical element constituted by a Mangin mirror having a meniscus shape and a negative refractive power. Providing a strong diverging function to a refractive surface of the Mangin mirror having the meniscus shape and the negative refractive power enables provision of the following optical effects.

a. It is possible to reduce the size of the central transmissive portion M1T of the first optical element M1 having a positive lens function relatively to an effective diameter thereof.

b. It is possible to cause longitudinal chromatic aberration of the first optical imaging system G1 as a catadioptric part to counterbalance that of the second optical imaging system G2 as a dioptric part. This makes it possible to increase the positive refractive power of each lens in the optical imaging system G2, which makes it easy to shorten the total optical system length.

In each example, the field-of-view of the catadioptric system 104 at the object 103 has a diameter of 3 mm or more, which provides a wide observation field of view.

Description will hereinafter be made of the configuration of a catadioptric system of each example of the present invention.

Example 1

Figure 3:
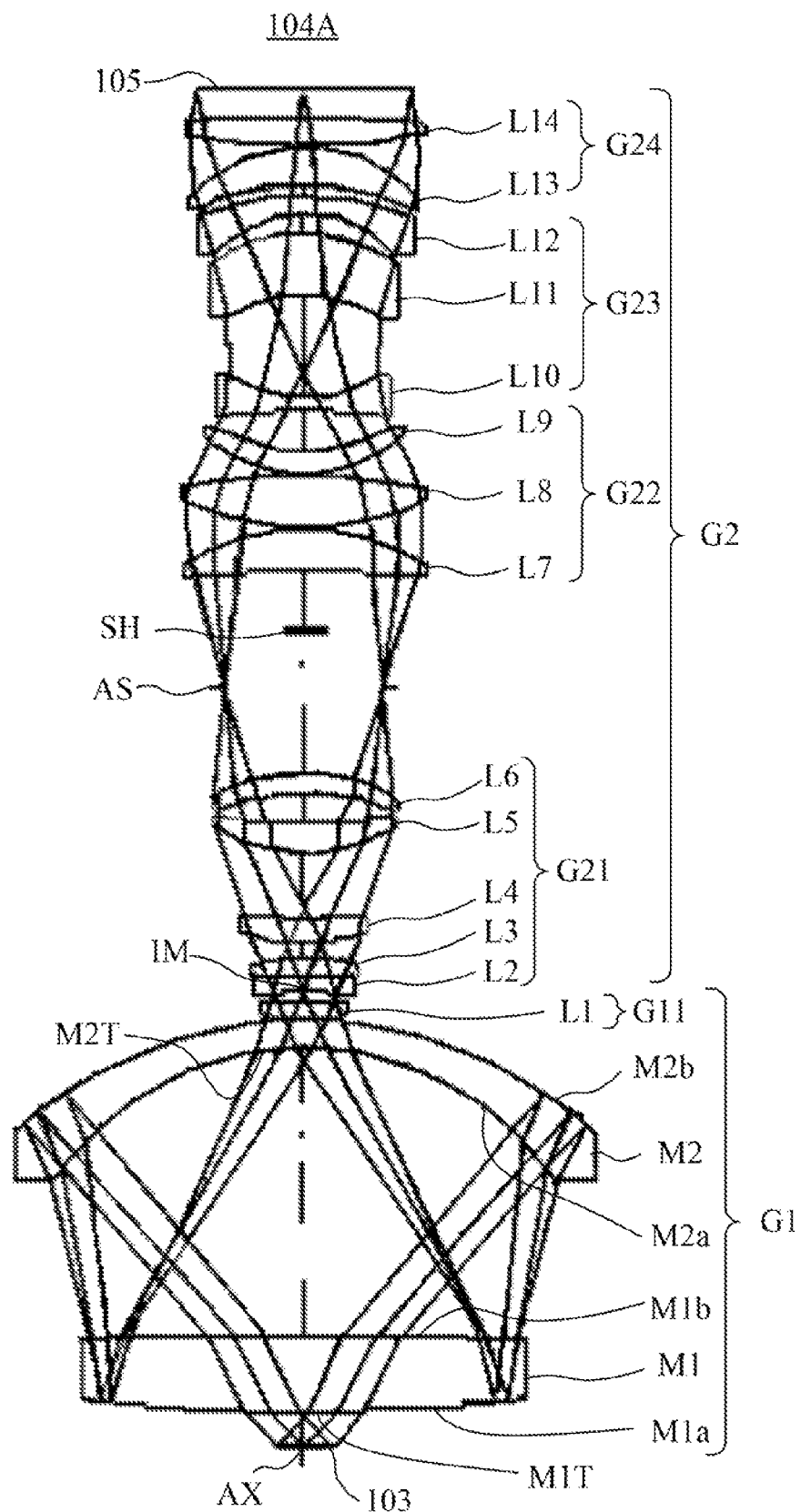
FIG. 3 shows main parts of a catadioptric system that is Example 1 of the present invention.

FIG. 3 is a cross-sectional view of main parts of the catadioptric system that is a first example (Example 1) of the present invention. In FIG. 3, reference numeral 104A denotes the catadioptric system, reference numeral 103 denotes the sample (object surface), and reference numeral 105 denotes the image pickup element (image surface). Reference character AS denotes the aperture stop, and reference character IM denotes the intermediate image. Moreover, reference character G1 denotes the first optical imaging system constituting the catadioptric part, and reference character G2 denotes the second optical imaging system constituting the dioptric part. The first optical imaging system G1 includes the first optical element (Mangin mirror) M1, the second optical element (Mangin mirror) M2 and the lens group G11. The second optical imaging system G2 includes the lens groups G21-G24 and the aperture stop AS.

In the catadioptric system 104A shown in FIG. 3, a light flux exiting from the sample 103 that has been illuminated with the light flux from the illumination optical system 102 shown in FIG. 1 passes through the central transmissive portion M1T of the first optical element (Mangin mirror) M1. Then, the light flux passes through the refractive surface M2a of the second optical element (Mangin mirror) M2, is reflected by the back-surface reflective portion M2b, and sequentially passes through the refractive surface M2a and the refractive surface M1b of the first optical element M1. Thereafter, the light flux is reflected by the back-surface reflective portion M1a of the first optical element M1 and then sequentially passes through the refractive surface M1b, the central transmissive portion M2T of the second optical element M2 and the lens group G11 (lens L1) to form the intermediate image IM of the sample 103.

Both the back-surface reflective portions M1a and M2b of the first and second optical elements M1 and M2 included in the first optical imaging system G1 have an aspherical shape. This enables sufficient correction of spherical aberration without generation chromatic aberration, which makes it possible to reduce various aberrations over a wide visible wavelength range while providing a high numerical aperture (NA).

Moreover, both the back-surface reflective portions M1a and M2b of the first and second optical elements M1 and M2 have a positive refractive power. This prevents, even though the positive refractive power of the second optical imaging system G2 is increased so as to shorten the total optical system length, a Petzval sum from being increased. This is because a reflective surface and a refractive surface have mutually opposite effects on the Petzval sum.

The light flux from the intermediate image IM sequentially passes through the lens group G21 (lenses L2-L6) having a positive refractive power, the aperture stop AS and the lens group G22 (lenses L7-L9) having a positive refractive power. The light flux further sequentially passes through the lens group G23 (lenses L10-L12) having a strong negative refractive power and the lens group G24 (lenses L13 and L14) having a positive refractive power to form an enlarged image of the sample 103 on the image pickup element 105. The second optical imaging system G2 includes the lens group G22 having the positive refractive power between the aperture stop AS and the lens group G23 having the strong negative refractive power, and includes a lens group configuration of positive, negative and positive refractive powers between the aperture stop AS and the image surface (image pickup element 105).

Such a configuration can converge the light flux by the lens group G22 having the positive refractive power and being placed immediately in rear of the aperture stop AS, so that the subsequent lens group G23 having the strong negative refractive power significantly deviates the off-axis light flux away from the optical axis AX while suppressing divergence of the light flux. This makes it easy to achieve a large enlarging magnification with a short total optical system length.

In addition, the light-blocking part SH is disposed between the aperture stop AS and the lens L7. The light-blocking part SH prevents a light flux from the sample 103 which is not reflected by the first and second optical elements M1 and M2 from passing through the central transmissive portions M1T and M2T of the first and second optical elements M1 and M2 to directly reach the image pickup element 105.

The catadioptric system 104A of this example has an object side numerical aperture (NA) of 0.7 and an object side field-of-view of φ21.2 mm. Moreover, in the catadioptric system 104A, the consecutive four lens surfaces providing the maximum negative combined refractive power among the plural lens surfaces arranged between the aperture stop AS and the image pickup element 105 are as follows. When reference character R1 denotes an object (sample) side surface and reference character R2 denotes an image side surface in each lens, the consecutive four lens surfaces providing the maximum negative combined refractive power are lens surfaces from an image side surface R2 of the lens L9 (L9R2) to an object side surface R1 of the lens L11 (L11R1). Arranging such consecutive four lens surfaces L9R2-L11R1 providing the strong negative combined refractive power between the aperture stop AS and the image pickup element 105 enables provision of an enlarging magnification of 4 times with a short total optical system length of 500 mm.

In addition, placing the lens group G24 having the positive refractive power immediately in front of the image pickup element 105 enables provision of an optical configuration telecentric on both the object side and image side. A ratio of an obscuration of the pupil is suppressed to 20 percent or less in area ratio.

Figure 4:
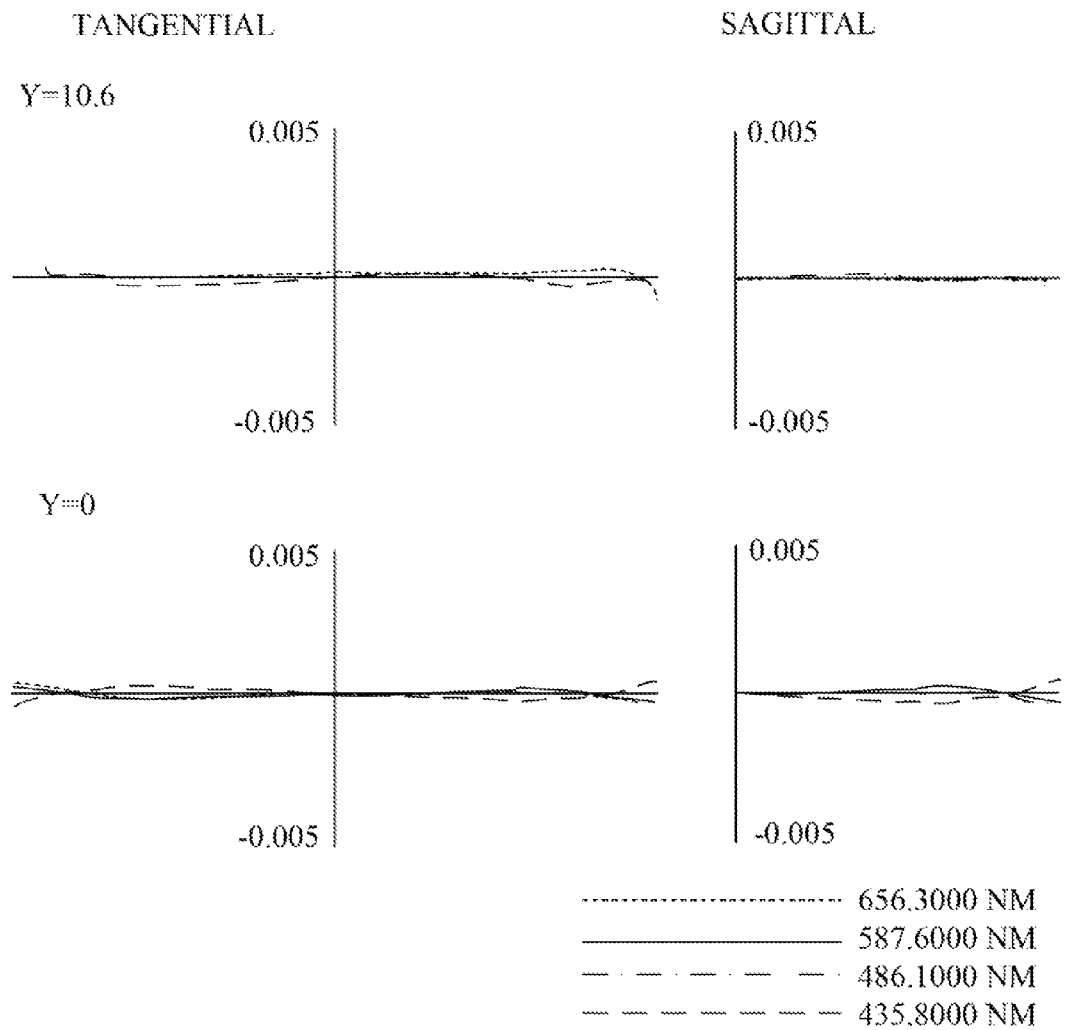
FIG. 4 shows aberration charts of the catadioptric system of Example 1.

FIG. 4 shows aberration charts of the catadioptric system of Example 1. In this example, aberrations at wavelengths of 656.3 nm, 587.6 nm, 486.1 nm and 435.8 nm are sufficiently suppressed, and a largest value of wavefront aberration of white light is suppressed to 90 mλrms or less. The sample 103 has a diameter of from 3 mm to 30 mm.

Example 2

Figure 5:
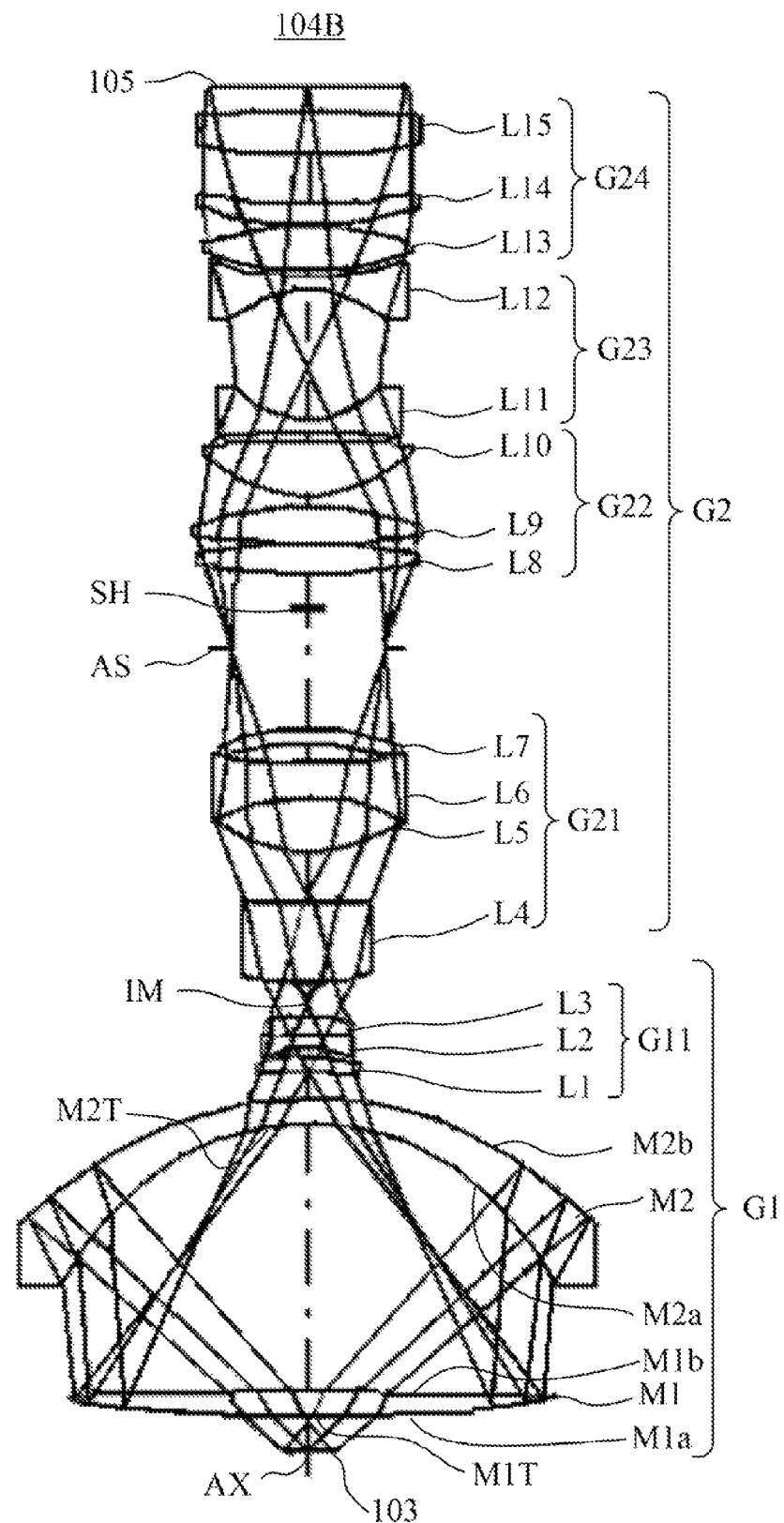
FIG. 5 shows main parts of a catadioptric system that is Example 2 of the present invention.

FIG. 5 is a cross-sectional view of main parts of the catadioptric system 104B that is a second example (Example 2) of the present invention. In FIG. 5, elements identical to those in FIG. 3 are denoted by the same reference numerals and characters as those in FIG. 3. The configuration of this example is nearly same as that of Example 1. The optical path of the light flux from the sample 103 to the passage through the second optical element M2 in this example is same as that in Example 1.

In this example, the light flux that has passed through the central transmissive portion M2T of the second optical element M2 passes through the lens group G11 (lenses L1-L3) and then forms the intermediate image IM of the sample 103. The light flux from the intermediate image IM sequentially passes through the lens group G21 (lenses L4-L7) having a positive refractive power, the aperture stop AS and the lens group G22 (lenses L8-L10) having a positive refractive power. The light flux further sequentially passes through the lens group G23 (lenses L11 and L12) having a strong negative refractive power and the lens group G24 (lenses L13-L15) having a positive refractive power to form an enlarged image of the sample 103 on the image pickup element 105.

In addition, the light-blocking part SH is disposed between the aperture stop AS and the lens L8. The light-blocking part SH prevents a light flux from the sample 103 which is not reflected by the first and second optical elements M1 and M2 from passing through the central transmissive portions M1T and M2T of the first and second optical elements M1 and M2 to directly reach the image pickup element 105.

The catadioptric system 104B of this example has an object side numerical aperture (NA) of 0.7 and an object side field-of-view of ϕ21.2 mm. Moreover, in the catadioptric system 104B, the consecutive four lens surfaces providing the maximum negative combined refractive power among the plural lens surfaces arranged between the aperture stop AS and the image pickup element 105 are lens surfaces from an object side surface R1 of the lens L11 (L11R1) to an image side surface R2 of the lens L12 (L12R2).

Arranging such consecutive four lens surfaces L11R1-L12R2 providing the strong negative combined refractive power between the aperture stop AS and the image pickup element 105 enables provision of an enlarging magnification of 4 times with a short total optical system length of 550 mm.

In addition, placing the lens group G24 having the positive refractive power immediately in front of the image pickup element 105 enables provision of an optical configuration telecentric on both the object side and image side. A ratio of an obscuration of the pupil is suppressed to 20 percent or less in area ratio.

Figure 6:
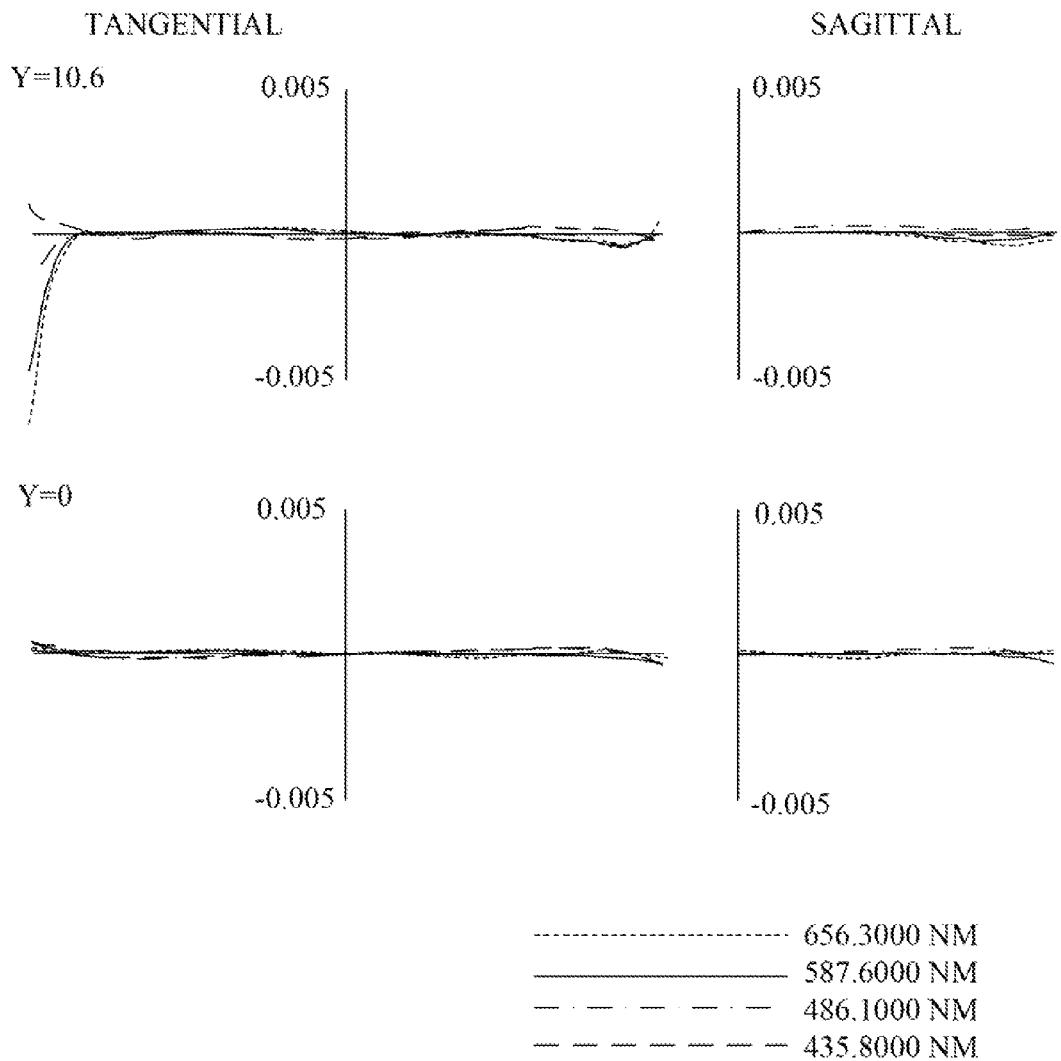
FIG. 6 shows aberration charts of the catadioptric system of Example 2.

FIG. 6 shows aberration charts of the catadioptric system of Example 2. In this example, aberrations at the above-described wavelengths are sufficiently suppressed, and a largest value of wavefront aberration of white light is suppressed to 60 mλrms or less.

Example 3

Figure 7:
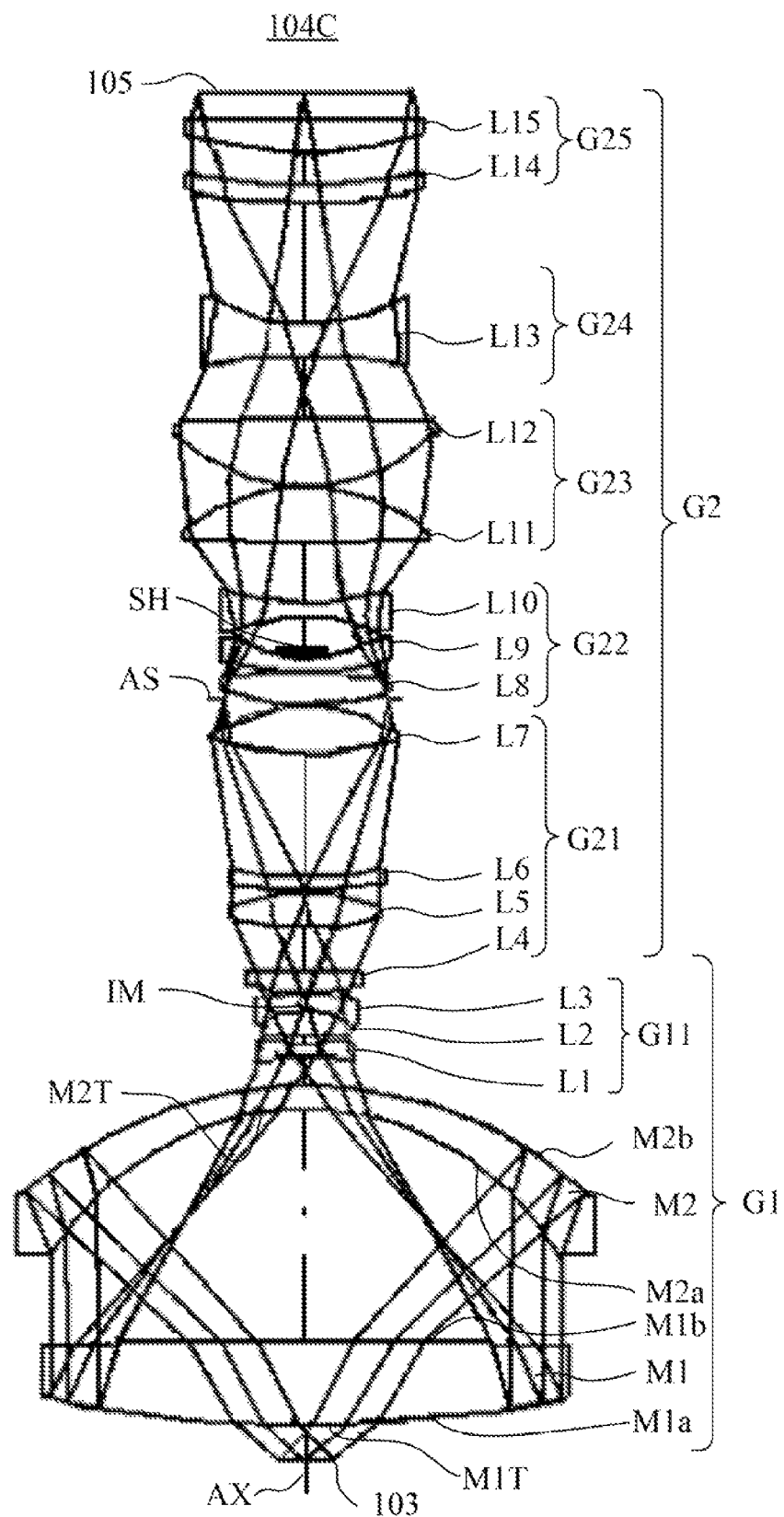
FIG. 7 shows main parts of a catadioptric system that is Example 3 of the present invention.

FIG. 7 is a cross-sectional view of main parts of the catadioptric system 104C that is a third example (Example 3) of the present invention. In FIG. 7, elements identical to those in FIG. 3 are denoted by the same reference numerals and characters as those in FIG. 3. The configuration of this example is nearly same as that of Example 1, but is different from that of Example 1 in that the second optical imaging system G2 is constituted by lens groups G21 to G25. The lens group G21 constitutes a front lens group, and the lens groups G22-G25 constitute a rear lens group.

The optical path of the light flux from the sample 103 to the passage through the second optical element M2 in this example is same as that in Example 1. In this example, the light flux that has passed through the central transmissive portion M2T of the second optical element M2 passes through the lenses L1 and L2 and then forms inside the lens L3 the intermediate image IM of the sample 103. The light flux from the intermediate image IM sequentially passes through the lens group G21 (lenses L4-L7) having a positive refractive power, the aperture stop AS, the lens group G22 (lenses L8-L10) having a strong negative refractive power and the lens group G23 (lenses L11 and L12) having a positive refractive power. The light flux further sequentially passes through the lens group G24 (lens L13) having a strong negative refractive power and the lens group G25 (lenses L14 and L15) having a positive refractive power to form an enlarged image of the sample 103 on the image pickup element 105.

The second optical imaging system G2 includes the lens group G22 having the strong negative refractive power and the lens group G23 having the positive refractive power between the aperture stop AS and the lens group G24 having the strong negative refractive power, and includes a lens group configuration of negative, positive, negative and positive refractive powers between the aperture stop AS and the image surface (image pickup element 105). According to such a configuration, the light flux diverged by the lens group G22 having the negative refractive power and being disposed immediately in rear of the aperture stop AS can be converged by the subsequent lens group G23 having the positive refractive power. Furthermore, placing the two lens groups G22 and G24 having the strong negative refractive powers between the aperture stop AS and the image pickup element 105 can significantly deviate the off-axis light flux away from the optical axis AX. Therefore, this configuration is suitable for achieving a large enlarging magnification with a short total optical system length. Moreover, sharing the negative refractive power between the aperture stop AS and the image pickup element 105 by the two lens groups G22 and G24 weakens the negative refractive power of each negative lens group, which can easily reduce aberrations of the optical system.

In addition, the light-blocking part SH is disposed on an image side surface R2 of the lens L9. The light-blocking part SH prevents a light flux from the sample 103 which is not reflected by the first and second optical elements M1 and M2 from passing through the central transmissive portions M1T and M2T of the first and second optical elements M1 and M2 to directly reach the image pickup element 105.

The catadioptric system 104C of this example has an object side numerical aperture (NA) of 0.7 and an object side field-of-view of ϕ21.2 mm. Moreover, in the catadioptric system 104C, the consecutive four lens surfaces providing the maximum negative combined refractive power among the plural lens surfaces arranged between the aperture stop AS and the image pickup element 105 are lens surfaces from an object side surface R1 of the lens L9 (L9R1) to an image side surface R2 of the lens L10 (L10R2). Arranging such consecutive four lens surfaces L9R1-L10R2 providing the strong negative combined refractive power between the aperture stop AS and the image pickup element 105 enables provision of an enlarging magnification of 4 times with a short total optical system length of 500 mm.

In addition, placing the lens group G25 having the positive refractive power immediately in front of the image pickup element 105 enables provision of an optical configuration telecentric on both the object side and image side. A ratio of an obscuration of the pupil is suppressed to 20 percent or less in area ratio.

Figure 8:
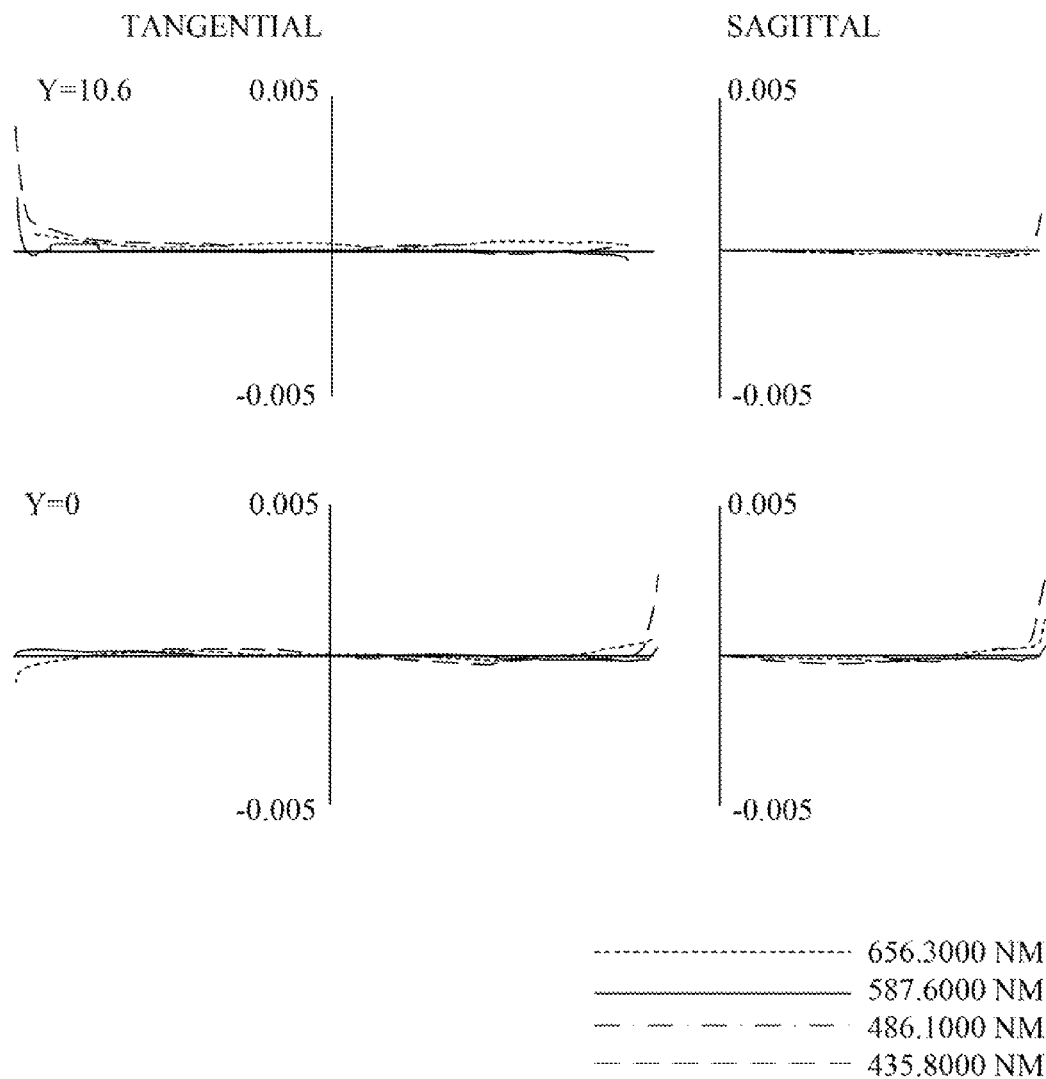
FIG. 8 shows aberration charts of the catadioptric system of Example 3.

FIG. 8 shows aberration charts of the catadioptric system of Example 3. In this example, aberrations at the above-described wavelengths are sufficiently suppressed, and a largest value of wavefront aberration of white light is suppressed to 70 mλrms or less.

Example 4

Figure 9:
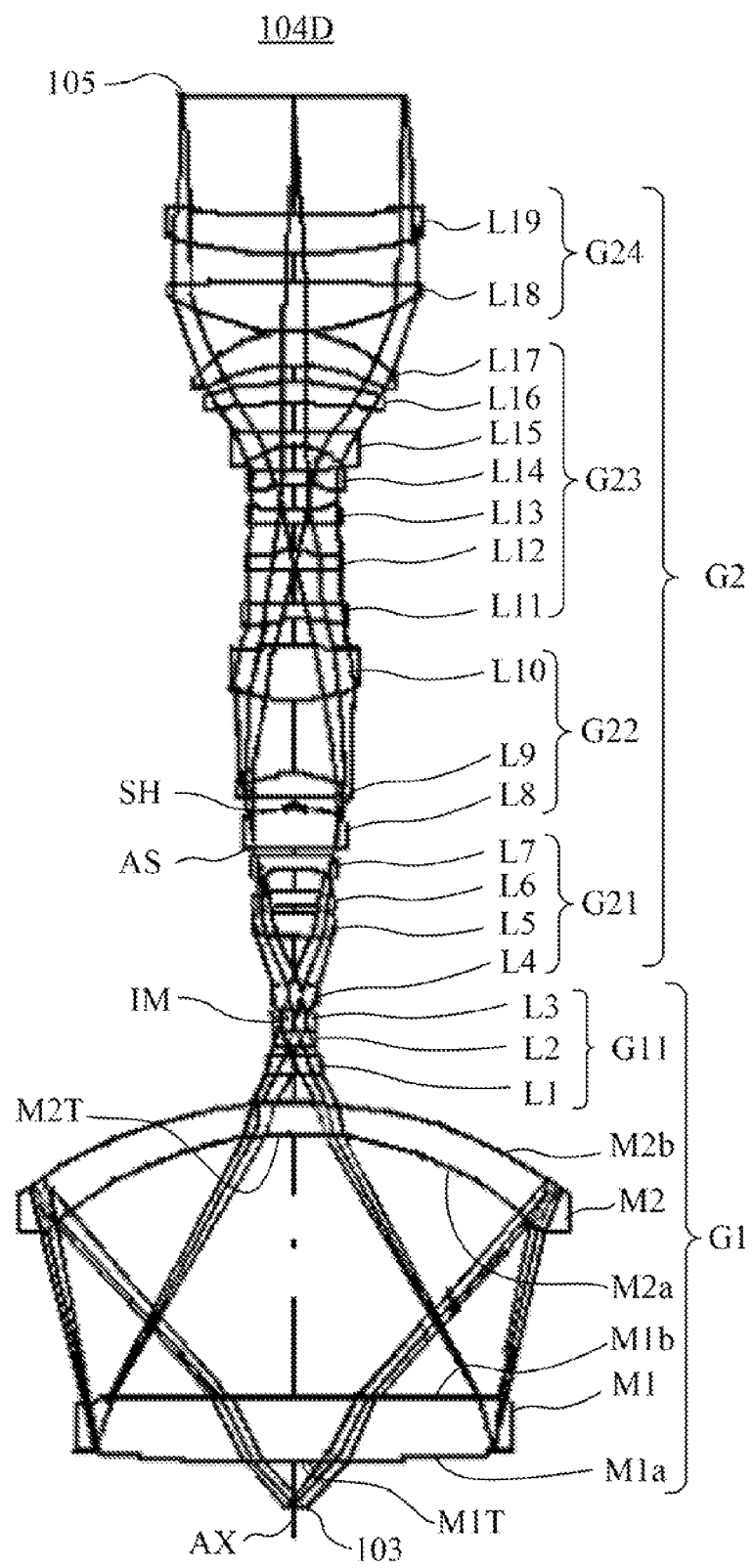
FIG. 9 shows main parts of a catadioptric system that is Example 4 of the present invention.

FIG. 9 is a cross-sectional view of main parts of the catadioptric system 104D that is a fourth example (Example 4) of the present invention. In FIG. 9, elements identical to those in FIG. 3 are denoted by the same reference numerals and characters as those in FIG. 3. The configuration of this example is nearly same as that of Example 1. The optical path of the light flux from the sample 103 to the passage through the second optical element M2 in this example is same as that in Example 1.

In this example, the light flux that has passed through the central transmissive portion M2T of the second optical element M2 passes through the lenses L1 and L2 and then forms inside the lens L3 the intermediate image IM of the sample 103. The light flux from the intermediate image IM sequentially passes through the lens group G21 (lenses L4-L7) having a positive refractive power, the aperture stop AS and the lens group G22 (lenses L8-L10) having a positive refractive power. The light flux further sequentially passes through the lens group G23 (lenses L11-L17) having a strong negative refractive power and the lens group G24 (lenses L18 and L19) having a positive refractive power to form an enlarged image of the sample 103 on the image pickup element 105.

In addition, the light-blocking part SH is disposed on an image side surface R2 of the lens L8. The light-blocking part SH prevents a light flux from the sample 103 which is not reflected by the first and second optical elements M1 and M2 from passing through the central transmissive portions M1T and M2T of the first and second optical elements M1 and M2 to directly reach the image pickup element 105.

The catadioptric system 104D of this example has an object side numerical aperture (NA) of 0.7 and an object side field-of-view of φ7 mm. Moreover, in the catadioptric system 104D, the consecutive four lens surfaces providing the maximum negative combined refractive power among the plural lens surfaces arranged between the aperture stop AS and the image pickup element 105 are lens surfaces from an object side surface R1 of the lens L14 (L14R1) to an image side surface R2 of the lens L15 (L15R2). Arranging such consecutive four lens surfaces L14R1-L15R2 providing the strong negative combined refractive power between the aperture stop AS and the image pickup element 105 enables provision of an enlarging magnification of 12 times with a short total optical system length of 500 mm.

In addition, placing the lens group G24 having the positive refractive power immediately in front of the image pickup element 105 enables provision of an optical configuration telecentric on both the object side and image side. A ratio of an obscuration of the pupil is suppressed to 20 percent or less in area ratio.

Figure 10:
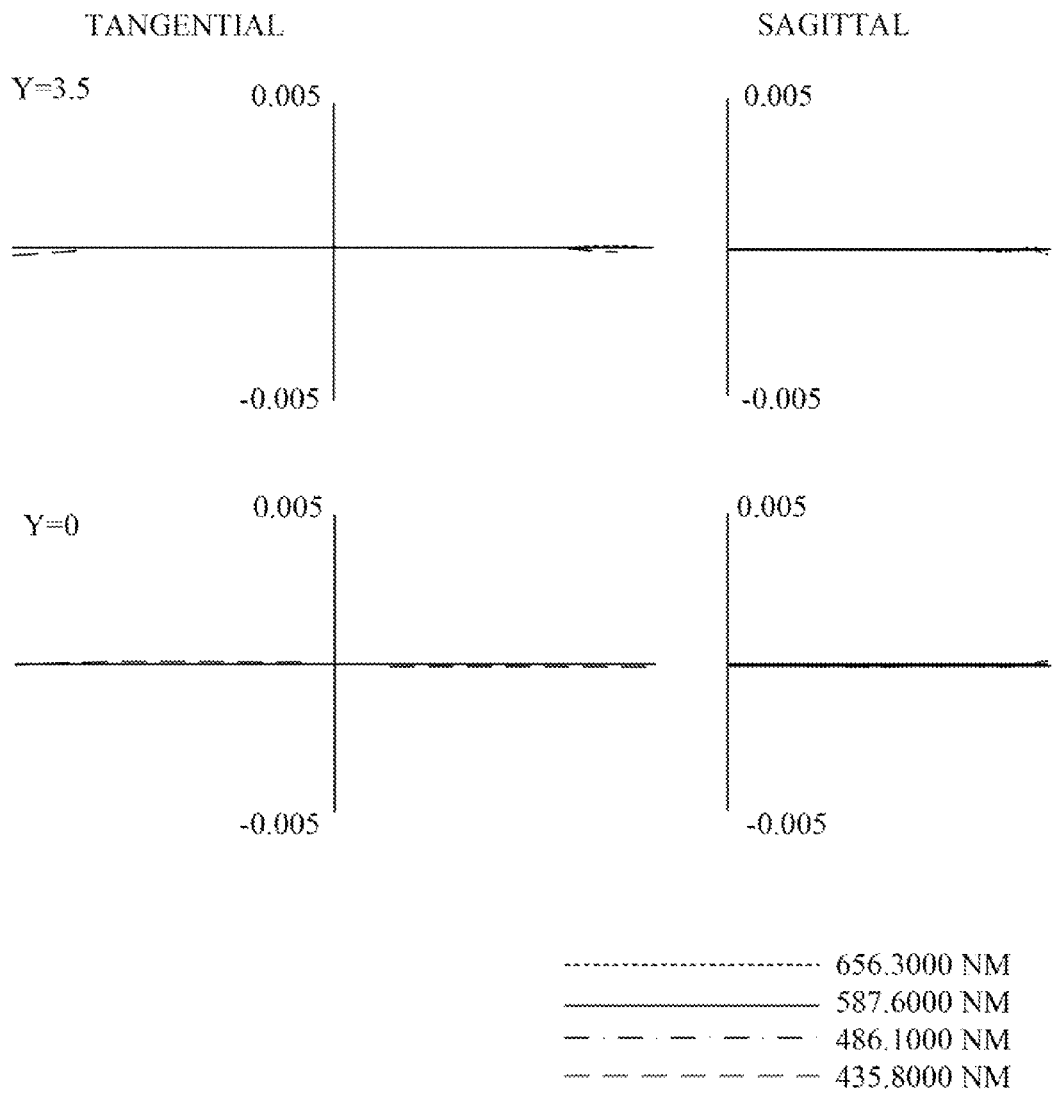
FIG. 10 shows aberration charts of the catadioptric system of Example 4.

FIG. 10 shows aberration charts of the catadioptric system of Example 4. In this example, aberrations at the above-described wavelengths are sufficiently suppressed, and a largest value of wavefront aberration of white light is suppressed to 30 mλrms or less.

Example 5

Figure 11:
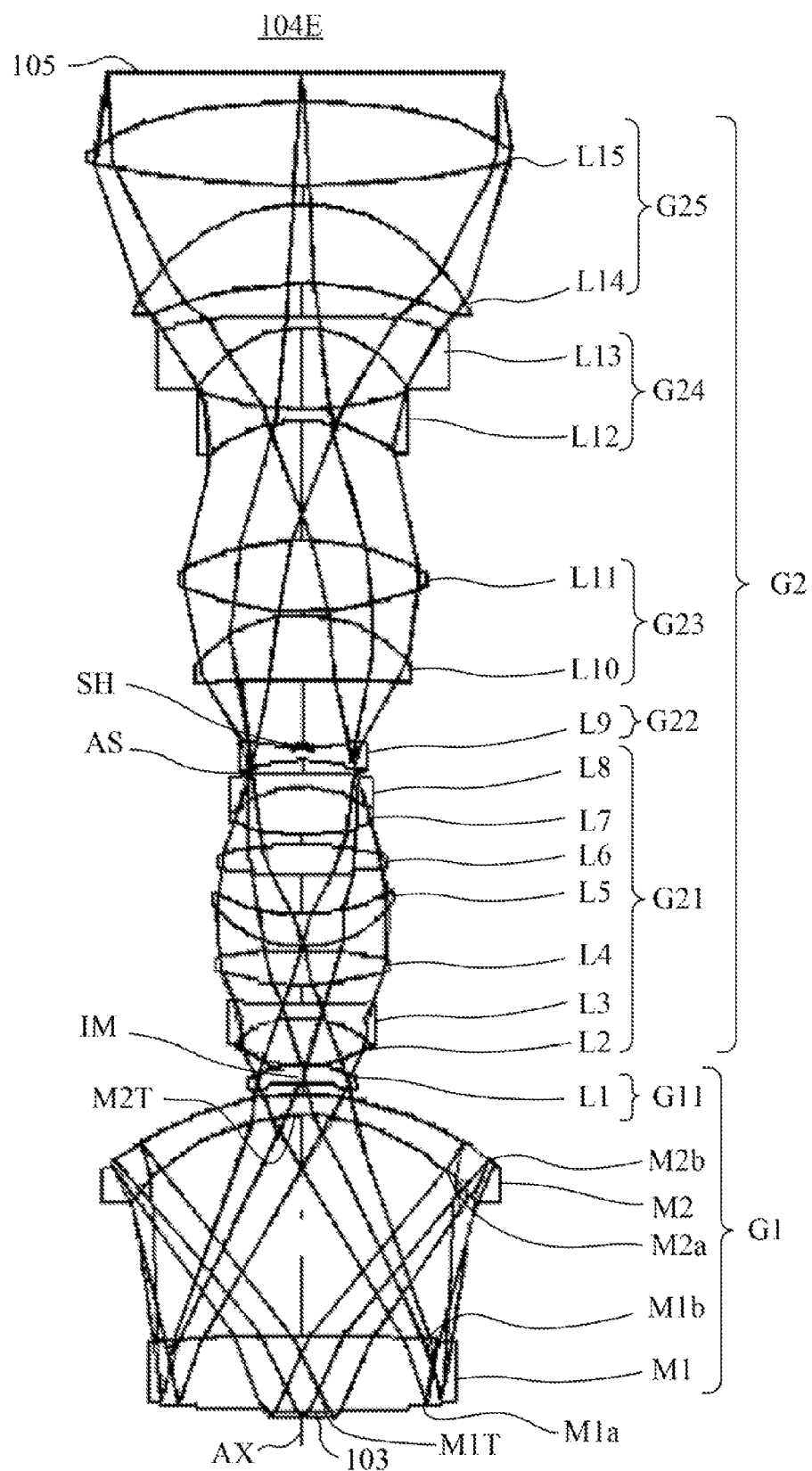
FIG. 11 shows main parts of a catadioptric system that is Example 5 of the present invention.

FIG. 11 is a cross-sectional view of main parts of the catadioptric system 104E that is a fifth example (Example 5) of the present invention. In FIG. 11, elements identical to those in FIG. 3 are denoted by the same reference numerals and characters as those in FIG. 3. The configuration of this example is nearly same as that of Example 1, but is different from that of Example 1 in that the second optical imaging system G2 is constituted by lens groups G21 to G25. The lens group G21 constitutes a front lens group, and the lens groups G22-G25 constitute a rear lens group.

The optical path of the light flux from the sample 103 to the passage through the second optical element M2 in this example is same as that in Example 1. In this example, the light flux that has passed through the central transmissive portion M2T of the second optical element M2 forms inside the lens L1 the intermediate image IM of the sample 103. The light flux from the intermediate image IM sequentially passes through the lens group G21 (lenses L2-L8) having a positive refractive power, the aperture stop AS, the lens group G22 (lens L9) having a strong negative refractive power and the lens group G23 (lenses L10 and L11) having a positive refractive power. The light flux further sequentially passes through the lens group G24 (lenses L12 and L13) having a strong negative refractive power and the lens group G25 (lenses L14 and L15) having a positive refractive power to form an enlarged image of the sample 103 on the image pickup element 105.

The second optical imaging system G2 includes the lens group G22 having the strong negative refractive power and the lens group G23 having the positive refractive power between the aperture stop AS and the lens group G24 having the strong negative refractive power, and includes a lens group configuration of negative, positive, negative and positive refractive powers between the aperture stop AS and the image surface (image pickup element 105).

According to such a configuration, the light flux diverged by the lens group G22 having the negative refractive power and being disposed immediately in rear of the aperture stop AS can be converged by the subsequent lens group G23 having the positive refractive power. Furthermore, placing the two lens groups G22 and G24 having the strong negative refractive powers between the aperture stop AS and the image pickup element 105 can significantly deviate the off-axis light flux away from the optical axis AX. Therefore, this configuration is suitable for achieving a large enlarging magnification with a short total optical system length. Moreover, sharing the negative refractive power between the aperture stop AS and the image pickup element 105 by the two lens groups G22 and G24 weakens the negative refractive power of each negative lens group, which can easily reduce aberrations of the optical system.

In addition, the light-blocking part SH is disposed on an image side surface R2 of the lens L9. The light-blocking part SH prevents a light flux from the sample 103 which is not reflected by the first and second optical elements M1 and M2 from passing through the central transmissive portions M1T and M2T of the first and second optical elements M1 and M2 to directly reach the image pickup element 105.

The catadioptric system 104E of this example has an object side numerical aperture (NA) of 0.7 and an object side field-of-view of φ28.2 mm. Moreover, in the catadioptric system 104E, the consecutive four lens surfaces providing the maximum negative combined refractive power among the plural lens surfaces arranged between the aperture stop AS and the image pickup element 105 are lens surfaces from an object side surface R1 of the lens L12 (L12R1) to an image side surface R2 of the lens L13 (L13R2). Arranging such consecutive four lens surfaces L12R1-L13R2 providing the strong negative combined refractive power between the aperture stop AS and the image pickup element 105 enables provision of an enlarging magnification of 6 times with a short total optical system length of 500 mm.

In addition, placing the lens group G25 having the positive refractive power immediately in front of the image pickup element 105 enables provision of an optical configuration telecentric on both the object side and image side. A ratio of an obscuration of the pupil is suppressed to 20 percent or less in area ratio.

Figure 12:
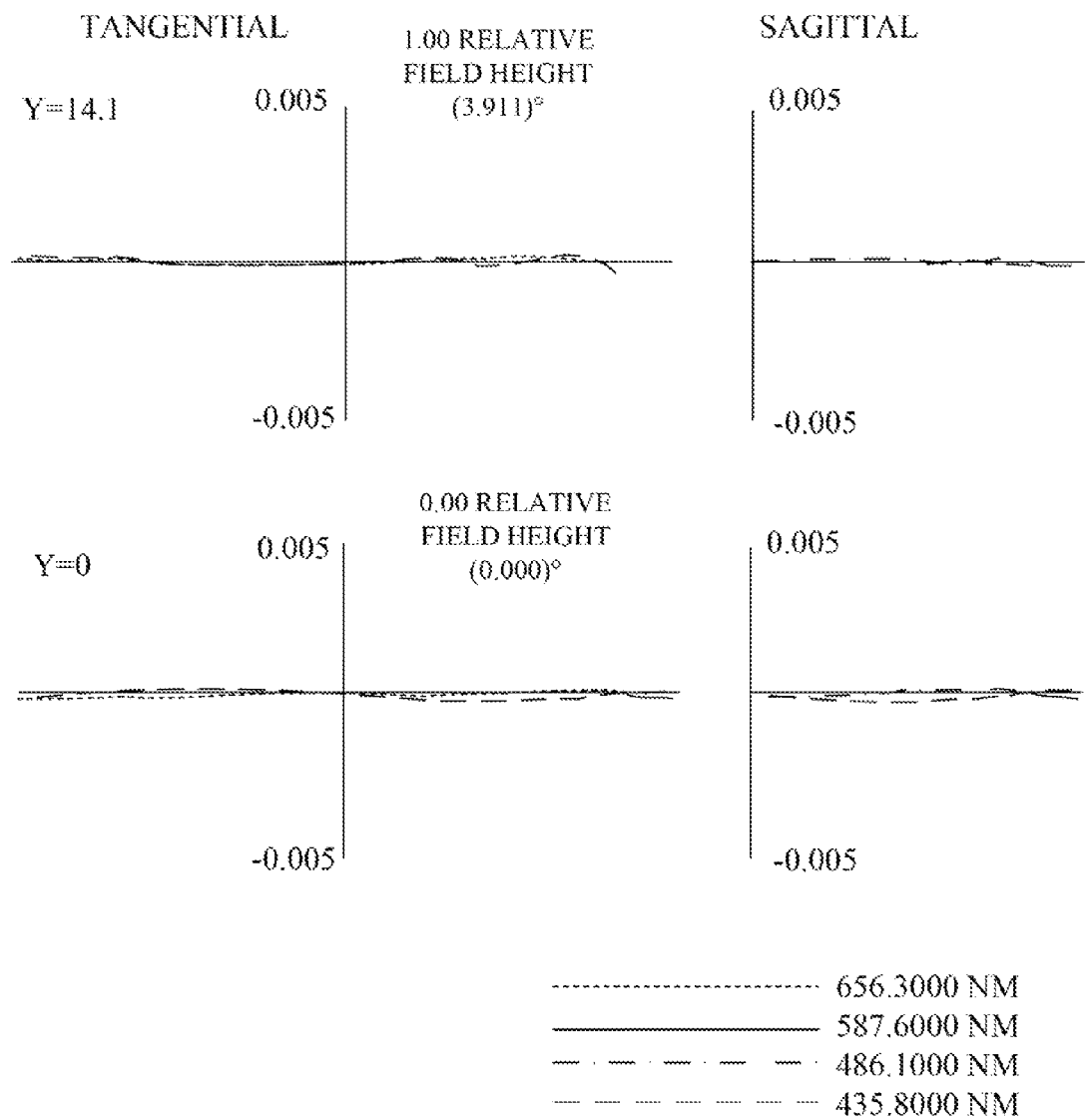
FIG. 12 shows aberration charts of the catadioptric system of Example 5.

FIG. 12 shows aberration charts of the catadioptric system of Example 5. In this example, aberrations at the above-described wavelengths are sufficiently suppressed, and a largest value of wavefront aberration of white light is suppressed to 40 mλrms or less.

Although the description was made of the catadioptric systems of Examples 1 to 5 used for the image pickup apparatus, these catadioptric systems can be used for an image pickup apparatus that performs scanning of a large image taking area and an image pickup apparatus that does not perform such scanning.

Next, numerical examples corresponding to the above-described examples are shown. Reference character i represents a surface number showing the order of optical surfaces counted from the object surface (sample surface) side toward the image surface side. Reference character r represents a curvature radius of the i-th optical surface. Reference character d represents a distance between the i-th optical surface and the i+1-th optical surface. The distance d is shown as a positive value when it is measured in a direction from the object surface side toward the image surface side (direction in which the light flux proceeds), and is shown as a negative value when it is measured in a direction reverse thereto.

Reference characters Nd and νd respectively represent a refractive index and an Abbe number (Abbe constant) of a material forming the optical element for a wavelength of 587.6 nm.

The shape of the aspherical surface is expressed by the following expression that is a general aspherical surface expression. In the following expression, Z represents a coordinate in a direction of the optical axis, c represents a curvature that is an inverse of the curvature radius r, h represents a height from the optical axis, k represents a conic coefficient, and A, B, C, D, E, F, G, H and J respectively represent 4th, 6th, 8th, 10th, 12th, 14th, 16th, 18th and 20th order aspherical coefficients.

$$Z = \frac{ch^2}{1 + \sqrt{(1+k)\,c^2 h^2}} + Ah^4 + Bh^6 + Ch^8 + Dh^{10} + Eh^{12} + Fh^{14} + Gh^{16} + Hh^{18} + Jh^{20} + \ldots$$

"E-X" means "$\times 10^{-X}$".

Table 1 shows relationships between the above-described conditions and each numerical example.

Numerical Example 1

$\phi_{n\_sum} \cdot Y_{max} = -0.494$
$\phi_{4n\_max} \cdot Y_{max} = -0.359$
$\phi_{L2} = 0.0089$

| SURFACE NO. | r | d | Nd | νd |
|---|---|---|---|---|
| OBJECT SURFACE | | 13.39 | | |
| 1 | 874.70 | 28.03 | 1.49 | 70.24 |
| 2 | −4231.60 | 105.76 | | |
| 3 | −124.98 | 10.01 | 1.52 | 52.43 |
| 4 | −176.51 | −10.01 | 1.52 | 52.43 |
| 5 | −124.98 | −105.76 | | |
| 6 | −4231.60 | −28.03 | 1.49 | 70.24 |
| 7 | 874.70 | 28.03 | 1.49 | 70.24 |
| 8 | −4231.60 | 105.76 | | |
| 9 | −124.98 | 10.01 | 1.52 | 52.43 |
| 10 | −176.51 | 0.53 | | |
| 11 | 90.32 | 6.36 | 1.61 | 56.82 |
| 12 | 1324.70 | 4.10 | | |
| 13 | −63.40 | 5.04 | 1.58 | 40.75 |
| 14 | 1018.95 | 7.44 | 1.62 | 60.29 |
| 15 | −62.32 | 4.95 | | |
| 16 | 80.73 | 8.87 | 1.59 | 61.14 |
| 17 | 376.22 | 23.62 | | |
| 18 | 63.15 | 12.68 | 1.62 | 60.29 |
| 19 | 727.65 | 10.30 | | |
| 20 | −103.75 | 8.15 | 1.76 | 27.51 |
| 21 | −73.26 | 30.86 | | |
| 22 | 0.00 | 43.00 | | |
| 23 | −420.24 | 15.20 | 1.72 | 47.93 |
| 24 | −95.89 | 0.50 | | |
| 25 | 116.97 | 19.45 | 1.76 | 47.82 |
| 26 | −221.60 | 0.84 | | |
| 27 | 64.76 | 7.55 | 1.76 | 27.51 |
| 28 | 67.36 | 14.95 | | |
| 29 | −401.04 | 5.00 | 1.74 | 32.26 |
| 30 | 55.13 | 37.49 | | |
| 31 | −60.79 | 23.10 | 1.76 | 27.51 |
| 32 | −64.39 | 6.57 | | |
| 33 | −48.86 | 6.63 | 1.67 | 32.10 |
| 34 | −132.64 | 3.67 | | |
| 35 | −111.24 | 14.71 | 1.74 | 44.79 |
| 36 | −62.94 | 0.50 | | |
| 37 | 305.88 | 10.23 | 1.74 | 44.79 |
| 38 | −1718.15 | 10.50 | | |
| IMAGE SURFACE | | 0.00 | | |

(Aspherical Coefficients)

| SURFACE NO. | | | |
|---|---|---|---|
| 1, 7 | K = 0.00E+00 | A = 5.55E−09 | B = −4.47E−14 |
| | C = 3.25E−17 | D = −2.55E−21 | E = 2.23E−25 |
| | F = −1.00E−29 | G = 2.56E−34 | H = 0.00E+00 |
| | J = 0.00E+00 | | |
| 4, 10 | K = 0.00E+00 | A = 4.16E−09 | B = 1.72E−13 |
| | C = 6.20E−18 | D = 1.32E−22 | E = 1.45E−26 |
| | F = −4.69E−31 | G = 2.88E−35 | H = 0.00E+00 |
| | J = 0.00E+00 | | |
| 17 | K = 0.00E+00 | A = 9.51E−07 | B = 8.27E−12 |
| | C = 1.98E−14 | D = 6.51E−19 | E = 1.29E−20 |
| | F = 0.00E+00 | G = 0.00E+00 | H = 0.00E+00 |
| | J = 0.00E+00 | | |
| 19 | K = 0.00E+00 | A = 1.03E−06 | B = 2.12E−10 |
| | C = 7.08E−15 | D = −8.54E−18 | E = 3.59E−21 |
| | F = 0.00E+00 | G = 0.00E+00 | H = 0.00E+00 |
| | J = 0.00E+00 | | |
| 26 | K = 0.00E+00 | A = 2.19E−07 | B = −1.80E−11 |
| | C = 4.12E−15 | D = −9.97E−19 | E = 1.19E−22 |
| | F = 0.00E+00 | G = 0.00E+00 | H = 0.00E+00 |
| | J = 0.00E+00 | | |
| 30 | K = 0.00E+00 | A = 1.84E−07 | B = 5.70E−11 |
| | C = −5.40E−14 | D = 5.15E−17 | E = −1.60E−20 |

-continued

|    |           |           |           |
|----|-----------|-----------|-----------|
| 38 | F = 0.00E+00 | G = 0.00E+00 | H = 0.00E+00 |
|    | J = 0.00E+00 |           |           |
|    | K = 0.00E+00 | A = −3.33E−07 | B = −2.49E−11 |
|    | C = 2.47E−14 | D = −8.17E−18 | E = 9.83E−22 |
|    | F = 0.00E+00 | G = 0.00E+00 | H = 0.00E+00 |
|    | J = 0.00E+00 |           |           |

Numerical Example 2

$\phi_{n\_sum} \cdot Y_{max} = -0.329$
$\phi_{4n\_max} \cdot Y_{max} = -0.510$
$\phi_{L2} = 0.0066$

| SURFACE NO. | r | d | Nd | νd |
|---|---|---|---|---|
| OBJECT SURFACE |  | 13.39 |  |  |
| 1 | 914.69 | 10.00 | 1.52 | 58.90 |
| 2 | −3746.87 | 108.16 |  |  |
| 3 | −119.33 | 10.30 | 1.52 | 58.90 |
| 4 | −171.61 | −10.30 | 1.52 | 58.90 |
| 5 | −119.33 | −108.16 |  |  |
| 6 | −3746.87 | −10.00 | 1.52 | 58.90 |
| 7 | 914.69 | 10.00 | 1.52 | 58.90 |
| 8 | −3746.87 | 108.16 |  |  |
| 9 | −119.33 | 10.30 | 1.52 | 58.90 |
| 10 | −171.61 | 10.50 |  |  |
| 11 | −166.20 | 6.28 | 1.60 | 60.64 |
| 12 | −78.85 | 2.58 |  |  |
| 13 | −59.36 | 5.00 | 1.70 | 30.13 |
| 14 | 165.70 | 8.66 | 1.58 | 59.37 |
| 15 | −60.59 | 12.89 |  |  |
| 16 | 91.17 | 32.10 | 1.74 | 44.79 |
| 17 | 32606.75 | 20.79 |  |  |
| 18 | 64.72 | 23.38 | 1.74 | 44.79 |
| 19 | −93.02 | 13.04 | 1.70 | 30.13 |
| 20 | 924.91 | 8.49 |  |  |
| 21 | −124.32 | 5.86 | 1.72 | 50.23 |
| 22 | −106.70 | 32.20 |  |  |
| 23 | 0.00 | 30.00 |  |  |
| 24 | 286.56 | 12.00 | 1.72 | 50.23 |
| 25 | −348.88 | 0.50 |  |  |
| 26 | 482.47 | 15.14 | 1.76 | 26.52 |
| 27 | −133.69 | 4.39 |  |  |
| 28 | 69.00 | 21.22 | 1.62 | 58.17 |
| 29 | −674.14 | 3.68 |  |  |
| 30 | −351.10 | 5.00 | 1.70 | 30.13 |
| 31 | 43.45 | 52.65 |  |  |
| 32 | −48.16 | 5.00 | 1.52 | 52.43 |
| 33 | 122.81 | 2.31 |  |  |
| 34 | 138.39 | 17.97 | 1.72 | 50.23 |
| 35 | −156.35 | 0.50 |  |  |
| 36 | 149.52 | 8.70 | 1.74 | 44.79 |
| 37 | 301.27 | 19.30 |  |  |
| 38 | 245.18 | 18.02 | 1.74 | 44.79 |
| 39 | −537.83 | 10.00 |  |  |
| IMAGE SURFACE |  | 0.00 |  |  |

(Aspherical Coefficients)

| SURFACE NO. |  |  |  |
|---|---|---|---|
| 1, 7 | K = 0.00E+00 | A = 7.23E−09 | B = 2.58E−13 |
|  | C = 4.55E−18 | D = −3.30E−23 | E = 1.43E−25 |
|  | F = −1.32E−29 | G = 6.00E−34 | H = 0.00E+00 |
|  | J = 0.00E+00 |  |  |
| 4, 10 | K = 0.00E+00 | A = 4.67E−09 | B = 2.22E−13 |
|  | C = 9.16E−18 | D = 2.18E−22 | E = 1.80E−26 |
|  | F = −1.31E−31 | G = 2.63E−35 | H = 0.00E+00 |
|  | J = 0.00E+00 |  |  |
| 17 | K = 0.00E+00 | A = 4.59E−07 | B = 5.81E−11 |
|  | C = 4.24E−15 | D = 5.46E−18 | E = −2.20E−21 |
|  | F = 0.00E+00 | G = 0.00E+00 | H = 0.00E+00 |
|  | J = 0.00E+00 |  |  |
| 20 | K = 0.00E+00 | A = 1.16E−06 | B = 2.27E−10 |
|  | C = 7.60E−14 | D = −1.40E−17 | E = 1.70E−20 |
|  | F = 0.00E+00 | G = 0.00E+00 | H = 0.00E+00 |
|  | J = 0.00E+00 |  |  |
| 27 | K = 0.00E+00 | A = 2.36E−07 | B = −7.77E−12 |
|  | C = −6.93E−16 | D = 3.97E−19 | E = −1.99E−23 |
|  | F = 0.00E+00 | G = 0.00E+00 | H = 0.00E+00 |
|  | J = 0.00E+00 |  |  |
| 31 | K = 0.00E+00 | A = −1.17E−08 | B = 2.80E−11 |
|  | C = 1.26E−13 | D = −8.64E−17 | E = 9.63E−20 |
|  | F = 0.00E+00 | G = 0.00E+00 | H = 0.00E+00 |
|  | J = 0.00E+00 |  |  |
| 32 | K = 0.00E+00 | A = 9.61E−07 | B = 3.85E−10 |
|  | C = 2.59E−13 | D = −4.59E−17 | E = 7.72E−20 |
|  | F = 0.00E+00 | G = 0.00E+00 | H = 0.00E+00 |
|  | J = 0.00E+00 |  |  |

Numerical Example 3

$\phi_{n\_sum} \cdot Y_{max} = -0.405$
$\phi_{4n\_max} \cdot Y_{max} = -0.270$
$\phi_{L2} = 0.0028$

| SURFACE NO. | r | d | Nd | νd |
|---|---|---|---|---|
| OBJECT SURFACE |  | 13.39 |  |  |
| 1 | 586.79 | 30.00 | 1.44 | 94.95 |
| 2 | −3739.09 | 84.78 |  |  |
| 3 | −120.61 | 8.81 | 1.52 | 64.14 |
| 4 | −168.63 | −8.81 | 1.52 | 64.14 |
| 5 | −120.61 | −84.78 |  |  |
| 6 | −3739.09 | −30.00 | 1.44 | 94.95 |
| 7 | 586.79 | 30.00 | 1.44 | 94.95 |
| 8 | −3739.09 | 84.78 |  |  |
| 9 | −120.61 | 8.81 | 1.52 | 64.14 |
| 10 | −168.63 | 10.50 |  |  |
| 11 | −77.11 | 5.00 | 1.60 | 39.24 |
| 12 | 266.92 | 2.71 |  |  |
| 13 | −723.40 | 9.66 | 1.72 | 46.02 |
| 14 | −29.36 | 5.00 | 1.70 | 30.13 |
| 15 | −143.84 | 0.50 |  |  |
| 16 | 79.04 | 7.96 | 1.74 | 44.79 |
| 17 | −391.94 | 16.42 |  |  |
| 18 | 144.85 | 12.47 | 1.64 | 60.08 |
| 19 | −86.52 | 0.50 |  |  |
| 20 | 136.18 | 5.00 | 1.74 | 44.79 |
| 21 | 156.95 | 47.11 |  |  |
| 22 | 122.64 | 16.20 | 1.52 | 64.14 |
| 23 | −71.07 | 3.00 |  |  |
| 24 | 0.00 | −2.50 |  |  |
| 25 | 102.71 | 11.64 | 1.74 | 32.26 |
| 26 | −347.95 | 0.50 |  |  |
| 27 | 126.81 | 5.00 | 1.67 | 38.15 |
| 28 | 57.67 | 15.23 |  |  |
| 29 | −75.67 | 5.00 | 1.75 | 35.33 |
| 30 | 104.26 | 22.30 |  |  |
| 31 | 1754.93 | 19.83 | 1.76 | 40.10 |
| 32 | −82.11 | 0.50 |  |  |
| 33 | 77.24 | 24.41 | 1.62 | 60.29 |
| 34 | −854.55 | 23.42 |  |  |
| 35 | −443.76 | 11.23 | 1.74 | 32.26 |
| 36 | 73.05 | 43.96 |  |  |
| 37 | 590.09 | 7.43 | 1.72 | 34.71 |
| 38 | 371.26 | 11.91 |  |  |
| 39 | 184.27 | 10.63 | 1.76 | 27.51 |
| 40 | −7014.76 | 10.50 |  |  |
| IMAGE SURFACE |  | 0.00 |  |  |

(Aspherical Coefficients)

| SURFACE NO. |  |  |  |
|---|---|---|---|
| 1, 7 | K = 0.00E+00 | A = 9.45E−09 | B = 2.42E−13 |
|  | C = 1.77E−17 | D = −4.42E−22 | E = 1.35E−25 |
|  | F = −9.87E−30 | G = 4.63E−34 | H = 0.00E+00 |
|  | J = 0.00E+00 |  |  |
| 4, 10 | K = 0.00E+00 | A = 7.09E−09 | B = 3.80E−13 |

-continued

|  |  |  |  |
|---|---|---|---|
|  | C = 1.50E−17 | D = 1.07E−21 | E = −3.64E−26 |
|  | F = 5.80E−30 | G = −1.18E−34 | H = 0.00E+00 |
|  | J = 0.00E+00 |  |  |
| 17 | K = 0.00E+00 | A = 1.09E−06 | B = −9.09E−11 |
|  | C = 1.29E−13 | D = −4.46E−17 | E = −1.02E−19 |
|  | F = 0.00E+00 | G = 0.00E+00 | H = 0.00E+00 |
|  | J = 0.00E+00 |  |  |
| 21 | K = 0.00E+00 | A = 9.93E−07 | B = 4.54E−10 |
|  | C = 2.40E−13 | D = −4.60E−17 | E = 1.35E−19 |
|  | F = 0.00E+00 | G = 0.00E+00 | H = 0.00E+00 |
|  | J = 0.00E+00 |  |  |
| 22 | K = 0.00E+00 | A = −3.59E−07 | B = 1.92E−11 |
|  | C = −3.34E−15 | D = 4.34E−18 | E = −3.88E−21 |
|  | F = 0.00E+00 | G = 0.00E+00 | H = 0.00E+00 |
|  | J = 0.00E+00 |  |  |
| 35 | K = 0.00E+00 | A = −1.20E−06 | B = 1.22E−10 |
|  | C = 8.36E−14 | D = −2.85E−17 | E = 2.65E−21 |
|  | F = 0.00E+00 | G = 0.00E+00 | H = 0.00E+00 |
|  | J = 0.00E+00 |  |  |
| 37 | K = 0.00E+00 | A = 1.08E−06 | B = −1.09E−10 |
|  | C = 5.30E−16 | D = 4.22E−18 | E = −7.17E−22 |
|  | F = 0.00E+00 | G = 0.00E+00 | H = 0.00E+00 |
|  | J = 0.00E+00 |  |  |

Numerical Example 4

$\phi_{n\_sum} \cdot Y_{max} = -0.176$
$\phi_{4n\_max} \cdot Y_{max} = -0.141$
$\phi_{L2} = 0.0083$

| SURFACE NO. | r | d | Nd | vd |
|---|---|---|---|---|
| OBJECT SURFACE |  | 15.82 |  |  |
| 1 | 901.94 | 22.89 | 1.52 | 58.90 |
| 2 | −3197.73 | 93.13 |  |  |
| 3 | −144.83 | 11.11 | 1.52 | 58.90 |
| 4 | −181.87 | −11.11 | 1.52 | 58.90 |
| 5 | −144.83 | −93.13 |  |  |
| 6 | −3197.73 | −22.89 | 1.52 | 58.90 |
| 7 | 901.94 | 22.89 | 1.52 | 58.90 |
| 8 | −3197.73 | 93.13 |  |  |
| 9 | −144.83 | 11.11 | 1.52 | 58.90 |
| 10 | −181.87 | 10.18 |  |  |
| 11 | −120.00 | 6.14 | 1.74 | 44.79 |
| 12 | −85.45 | 3.34 |  |  |
| 13 | −49.88 | 5.25 | 1.64 | 34.47 |
| 14 | 32.06 | 7.75 | 1.74 | 44.79 |
| 15 | −239.70 | 0.50 |  |  |
| 16 | 46.16 | 8.68 | 1.72 | 43.71 |
| 17 | −96.38 | 15.77 |  |  |
| 18 | 42.98 | 9.77 | 1.76 | 47.82 |
| 19 | −116.10 | 1.65 |  |  |
| 20 | −116.10 | 5.55 | 1.80 | 29.84 |
| 21 | −69.89 | 7.93 |  |  |
| 22 | −30.23 | 5.55 | 1.53 | 48.84 |
| 23 | 523.21 | 2.32 |  |  |
| 24 | 0.00 | 1.00 |  |  |
| 25 | −2496.38 | 13.59 | 1.73 | 40.51 |
| 26 | −56.33 | 4.23 |  |  |
| 27 | −135.33 | 7.65 | 1.60 | 60.64 |
| 28 | −54.37 | 26.11 |  |  |
| 29 | 58.55 | 18.80 | 1.76 | 47.82 |
| 30 | −329.61 | 9.89 |  |  |
| 31 | −80.12 | 5.00 | 1.72 | 34.71 |
| 32 | 171.07 | 12.67 |  |  |
| 33 | −637.02 | 6.27 | 1.74 | 32.26 |
| 34 | −112.67 | 9.87 |  |  |
| 35 | −603.68 | 5.10 | 1.61 | 44.27 |
| 36 | 121.23 | 8.84 |  |  |
| 37 | −51.43 | 5.00 | 1.76 | 27.51 |
| 38 | 750.98 | 8.79 |  |  |
| 39 | −27.80 | 5.00 | 1.60 | 60.64 |
| 40 | −667.36 | 9.36 |  |  |
| 41 | −295.65 | 8.02 | 1.58 | 59.37 |
| 42 | −118.89 | 5.79 |  |  |
| 43 | −73.00 | 11.77 | 1.74 | 44.79 |
| 44 | −52.55 | 0.50 |  |  |
| 45 | 99.25 | 16.98 | 1.60 | 39.24 |
| 46 | −5527.02 | 10.12 |  |  |
| 47 | 195.00 | 13.78 | 1.74 | 32.26 |
| 48 | 511.43 | 42.54 |  |  |
| IMAGE SURFACE |  | 0.00 |  |  |

(Aspherical Coefficients)

| SURFACE NO. |  |  |  |
|---|---|---|---|
| 1, 7 | K = 0.00E+00 | A = 1.68E−09 | B = −2.27E−14 |
|  | C = 6.48E−18 | D = 2.22E−22 | E = −6.17E−26 |
|  | F = 6.45E−30 | G = −2.24E−34 | H = 0.00E+00 |
|  | J = 0.00E+00 |  |  |
| 4, 10 | K = 0.00E+00 | A = 3.18E−09 | B = 1.33E−13 |
|  | C = 4.64E−18 | D = 7.74E−23 | E = 1.31E−26 |
|  | F = −5.87E−31 | G = 3.00E−35 | H = 0.00E+00 |
|  | J = 0.00E+00 |  |  |
| 17 | K = 0.00E+00 | A = 6.33E−06 | B = 3.98E−09 |
|  | C = 3.09E−11 | D = −2.89E−13 | E = 4.86E−21 |
|  | F = 0.00E+00 | G = 0.00E+00 | H = 0.00E+00 |
|  | J = 0.00E+00 |  |  |
| 21 | K = 0.00E+00 | A = 1.58E−06 | B = 4.93E−10 |
|  | C = −1.65E−13 | D = −4.51E−15 | E = 1.59E−19 |
|  | F = 0.00E+00 | G = 0.00E+00 | H = 0.00E+00 |
|  | J = 0.00E+00 |  |  |
| 26 | K = 0.00E+00 | A = 8.11E−07 | B = −2.29E−11 |
|  | C = −2.76E−13 | D = 2.90E−16 | E = −1.03E−18 |
|  | F = 0.00E+00 | G = 0.00E+00 | H = 0.00E+00 |
|  | J = 0.00E+00 |  |  |
| 32 | K = 0.00E+00 | A = 1.97E−06 | B = −7.11E−10 |
|  | C = −3.06E−13 | D = −7.13E−17 | E = −4.75E−20 |
|  | F = 0.00E+00 | G = 0.00E+00 | H = 0.00E+00 |
|  | J = 0.00E+00 |  |  |
| 48 | K = 0.00E+00 | A = 1.55E−07 | B = 8.66E−12 |
|  | C = 1.67E−15 | D = −5.06E−19 | E = 7.51E−23 |
|  | F = 0.00E+00 | G = 0.00E+00 | H = 0.00E+00 |
|  | J = 0.00E+00 |  |  |

Numerical Example 5

$\phi_{n\_sum} \cdot Y_{max} = -0.576$
$\phi_{4n\_max} \cdot Y_{max} = -0.347$
$\phi_{L2} = 0.0083$

| SURFACE NO. | r | d | Nd | vd |
|---|---|---|---|---|
| OBJECT SURFACE |  | 3.00 |  |  |
| 1 | 783.74 | 28.01 | 1.49 | 70.24 |
| 2 | −797.06 | 81.57 |  |  |
| 3 | −102.12 | 7.77 | 1.52 | 64.14 |
| 4 | −140.83 | −7.77 | 1.52 | 64.14 |
| 5 | −102.12 | −81.57 |  |  |
| 6 | −797.06 | −28.01 | 1.49 | 70.24 |
| 7 | 783.74 | 28.01 | 1.49 | 70.24 |
| 8 | −797.06 | 81.57 |  |  |
| 9 | −102.12 | 7.77 | 1.52 | 64.14 |
| 10 | −140.83 | 3.49 |  |  |
| 11 | −154.32 | 7.05 | 1.64 | 55.38 |
| 12 | −72.36 | 0.50 |  |  |
| 13 | 63.71 | 17.64 | 1.44 | 94.95 |
| 14 | −50.65 | 5.00 | 1.67 | 38.15 |
| 15 | 531.40 | 7.25 |  |  |
| 16 | 134.93 | 13.56 | 1.70 | 48.52 |
| 17 | −176.29 | 0.50 |  |  |
| 18 | 54.79 | 12.36 | 1.60 | 65.44 |
| 19 | 118.83 | 14.42 |  |  |
| 20 | 234.49 | 11.45 | 1.75 | 35.28 |
| 21 | −144.57 | 3.61 |  |  |
| 22 | 99.73 | 17.43 | 1.60 | 65.44 |
| 23 | −54.76 | 5.00 | 1.67 | 38.15 |
| 24 | −392.90 | 1.00 |  |  |
| 25 | 0.00 | 3.84 |  |  |

-continued

| | | | | |
|---|---|---|---|---|
| 26 | −82.47 | 5.00 | 1.61 | 43.71 |
| 27 | 106.23 | 26.38 | | |
| 28 | −475.21 | 23.33 | 1.72 | 43.69 |
| 29 | −65.34 | 0.50 | | |
| 30 | 136.04 | 26.85 | 1.49 | 70.24 |
| 31 | −132.13 | 44.13 | | |
| 32 | −86.09 | 5.00 | 1.74 | 32.26 |
| 33 | 175.53 | 29.93 | | |
| 34 | −56.65 | 5.00 | 1.49 | 70.24 |
| 35 | −1735.21 | 11.41 | | |
| 36 | −183.59 | 29.63 | 1.76 | 40.10 |
| 37 | −85.12 | 6.37 | | |
| 38 | 456.98 | 31.46 | 1.68 | 50.72 |
| 39 | −468.94 | 10.50 | | |
| IMAGE SURFACE | | 0.00 | | |

(Aspherical Coefficients)

| SURFACE NO. | | | |
|---|---|---|---|
| 1, 7 | K = 0.00E+00<br>C = 3.96E−17<br>F = 1.54E−28<br>J = 0.00E+00 | A = 1.67E−09<br>D = 3.63E−21<br>G = −7.54E−33 | B = 3.09E−13<br>E = −9.72E−25<br>H = 0.00E+00 |
| 4, 10 | K = 0.00E+00<br>C = 2.43E−17<br>F = −8.73E−30<br>J = 0.00E+00 | A = 7.26E−09<br>D = 2.13E−22<br>G = 6.74E−34 | B = 4.06E−13<br>E = 1.53E−25<br>H = 0.00E+00 |
| 13 | K = 0.00E+00<br>C = −1.77E−12<br>F = 4.64E−21<br>J = 0.00E+00 | A = −6.61E−07<br>D = 4.28E−15<br>G = −1.49E−24 | B = 3.61E−10<br>E = −6.07E−18<br>H = 0.00E+00 |
| 19 | K = 0.00E+00<br>C = −3.89E−14<br>F = 8.62E−23<br>J = 0.00E+00 | A = 1.06E−06<br>D = 1.21E−16<br>G = −2.47E−26 | B = 1.26E−10<br>E = −1.34E−19<br>H = 0.00E+00 |
| 20 | K = 0.00E+00<br>C = 7.61E−14<br>F = 4.21E−23<br>J = 0.00E+00 | A = −2.24E−07<br>D = 2.93E−17<br>G = −1.52E−26 | B = −2.10E−10<br>E = −6.10E−20<br>H = 0.00E+00 |
| 22 | K = 0.00E+00<br>C = −1.22E−13<br>F = 2.37E−22<br>J = 0.00E+00 | A = −3.39E−07<br>D = 1.12E−16<br>G = −7.09E−26 | B = 1.40E−10<br>E = −2.82E−19<br>H = 0.00E+00 |
| 27 | K = 0.00E+00<br>C = −6.29E−13<br>F = 5.49E−22<br>J = 0.00E+00 | A = −8.37E−07<br>D = 8.80E−16<br>G = −1.47E−25 | B = 4.38E−10<br>E = −9.05E−19<br>H = 0.00E+00 |
| 28 | K = 0.00E+00<br>C = −8.58E−15<br>F = 1.53E−25<br>J = 0.00E+00 | A = −5.75E−07<br>D = 2.98E−18<br>G = −2.07E−29 | B = 6.56E−11<br>E = −1.39E−21<br>H = 0.00E+00 |
| 31 | K = 0.00E+00<br>C = 1.85E−15<br>F = 4.81E−26<br>J = 0.00E+00 | A = −2.68E−07<br>D = 1.56E−19<br>G = −1.39E−30 | B = 3.68E−11<br>E = −3.12E−22<br>H = 0.00E+00 |
| 32 | K = 0.00E+00<br>C = 1.46E−15<br>F = −2.08E−24<br>J = 0.00E+00 | A = −1.11E−06<br>D = −1.61E−17<br>G = 4.09E−28 | B = 1.65E−10<br>E = 3.66E−21<br>H = 0.00E+00 |
| 35 | K = 0.00E+00<br>C = −5.75E−14<br>F = 2.68E−25<br>J = 0.00E+00 | A = −7.37E−07<br>D = 1.31E−17<br>G = −1.43E−29 | B = 2.14E−10<br>E = −2.37E−21<br>H = 0.00E+00 |
| 39 | K = 0.00E+00<br>C = −8.94E−15<br>F = 8.95E−27<br>J = 0.00E+00 | A = −2.14E−07<br>D = 1.60E−18<br>G = −2.10E−31 | B = 3.18E−11<br>E = −1.62E−22<br>H = 0.00E+00 |

TABLE 1

| | NUMERICAL EXAMPLE | | | | |
|---|---|---|---|---|---|
| CONDITION | 1 | 2 | 3 | 4 | 5 |
| (1) | −0.359 | −0.510 | −0.270 | −0.141 | −0.347 |
| (2) | −0.494 | −0.329 | −0.405 | −0.176 | −0.576 |
| (COMBINED REFRACTIVE POWER)$\phi_{L2}$ | 0.0089 | 0.0066 | 0.0028 | 0.0083 | 0.0083 |

Comparative Example

The first example disclosed in Japanese translation of PCT international application No. 2001-517806 has a field-of-view size of $\phi 1$ mm ($Y_{max}$=0.5 mm), and provides a value of $\phi_{4n\_max} \cdot Y_{max}$ of −0.013, which exceeds the upper limit of the condition (1). Therefore, the total optical system length (distance from an object surface to an image surface) is increased to 900 mm or more for the above field-of-view size. Moreover, the first example disclosed in Japanese Patent Laid-Open No. 2002-082285 has a field-of-view size of $\phi 14.2$ mm ($Y_{max}$=7.1 mm), and provides a value of $\phi_{4n\_max} \cdot Y_{max}$ of −0.138, which also exceeds the upper limit of the condition (1). Thus, the total optical system length is increased to about 1000 mm for the above field-of-view size.

Accordingly, not satisfying the condition (1) increases the total optical system length and the size of the image pickup apparatus, which is undesirable.

While the present invention has been described with reference to exemplary examples, it is to be understood that the invention is not limited to the disclosed exemplary examples. The scope of the following claims is to be accorded the broadest interpretation so as to encompass all such modifications, equivalent structures and functions.

This application claims the benefit of Japanese Patent Application No. 2010-121751, filed on May 27, 2010, which is hereby incorporated by reference herein in its entirety.

INDUSTRIAL APPLICABILITY

A catadioptric system is provided which is suitable for, for example, image pickup apparatuses.

The invention claimed is:
1. A catadioptric system comprising:
a first optical imaging system including a catadioptric part configured to collect a light flux from an object so as to cause the light flux to form an intermediate image of the object; and
a second optical imaging system including a dioptric part configured to cause the light flux from the intermediate image to form an image on an image surface,
wherein the first optical imaging system includes, in order from an object side, a first optical element that includes a first transmissive portion in its central portion on and around an optical axis and a first reflective portion on its peripheral object side surface, and a second optical element that includes a second transmissive portion in its central portion on and around the optical axis and a second reflective portion on its peripheral image side surface, the first and second optical elements being arranged such that the first and second reflective surfaces face each other,
wherein the light flux from the object sequentially passes the first transmissive portion, the second reflective portion, the first reflective portion and the second transmissive portion in the first optical imaging system and then exits toward the second optical imaging system, wherein the second optical imaging system includes, in order from the object side, a front lens group having a positive refractive power, an aperture stop and a rear lens group, wherein, in the second optical imaging system, consecutive four lens surfaces among plural lens surfaces placed between the aperture stop and the image surface have a negative combined refractive power, and wherein the following condition is satisfied:

$$-0.5 < \phi_{4n\_max} \cdot Y_{max} < -0.14$$

where $\phi_{4n\_max}$ represents a maximum value of the negative combined refractive power, and $Y_{max}$ represents a maximum object height in a field-of-view of the catadioptric system at the object.

2. A catadioptric system according to claim 1, wherein the following condition is satisfied:

$$-0.58 < \phi_{n\_sum} \cdot Y_{max} < -0.17$$

where $\phi_{n\_sum}$ represents a sum of negative refractive powers of negative lens surfaces placed between the aperture stop and the image surface.

3. A catadioptric system according to claim 1, wherein a combined refractive power of two lenses placed closest to the image surface is a positive refractive power.

4. A catadioptric system according to claim 1, wherein the first optical element has a convex object side surface, the first transmissive portion thereof has a positive refractive power, the second optical element has a meniscus shape including a concave object side surface, and the second transmissive portion thereof has a negative refractive power.

5. A catadioptric system according to claim 1, wherein the field-of-view at the object has a diameter of 3 mm or more.

6. An image pickup apparatus comprising:
a light source;
an illumination optical system configured to illuminate an object with a light flux from the light source;
a catadioptric system configured to cause the light flux from the object to form an object image;
an image pickup element configured to convert the object image into an electrical signal; and
an image processing system configured to produce image information from the electrical signal output from the image pickup element;
wherein the catadioptric system includes:
a first optical imaging system including a catadioptric part configured to collect a light flux from an object so as to cause the light flux to form an intermediate image of the object; and
a second optical imaging system including a dioptric part configured to cause the light flux from the intermediate image to form an image on an image surface,
wherein the first optical imaging system includes, in order from an object side, a first optical element that includes a first transmissive portion in its central portion on and around an optical axis and a first reflective portion on its peripheral object side surface, and a second optical element that includes a second transmissive portion in its central portion on and around the optical axis and a second reflective portion on its peripheral image side surface, the first and second optical elements being arranged such that the first and second reflective surfaces face each other,
wherein the light flux from the object sequentially passes the first transmissive portion, the second reflective portion, the first reflective portion and the second transmissive portion in the first optical imaging system and then exits toward the second optical imaging system,
wherein the second optical imaging system includes, in order from the object side, a front lens qroup having a positive refractive power, an aperture stop and a rear lens group,
wherein, in the second optical imaging system, consecutive four lens surfaces among plural lens surfaces placed between the aperture stop and the image surface have a negative combined refractive power, and
wherein the following condition is satisfied:

$$-0.52 < \phi_{4n\_max} \cdot Y_{max} < -0.14$$

where $\phi_{4n\_max}$ represents a maximum value of the negative combined refractive power, and $Y_{max}$ represents a maximum object height in a field-of-view of the catadioptric system at the object.

* * * * *